United States Patent
Kim et al.

(10) Patent No.: US 10,367,660 B2
(45) Date of Patent: Jul. 30, 2019

(54) RATE DETERMINATION APPARATUS, RATE DETERMINATION METHOD, AND RECEPTION APPARATUS

(71) Applicant: Renesas Electronics Corporation, Tokyo (JP)

(72) Inventors: Kichung Kim, Tokyo (JP); Hiroyuki Okada, Tokyo (JP); Naohiro Matsui, Tokyo (JP); Tomoaki Hirota, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/801,394

(22) Filed: Nov. 2, 2017

(65) Prior Publication Data
US 2018/0167238 A1   Jun. 14, 2018

(30) Foreign Application Priority Data
Dec. 14, 2016   (JP) ................... 2016-241909

(51) Int. Cl.
*H04L 25/02* (2006.01)
*H04L 1/04* (2006.01)
(Continued)

(52) U.S. Cl.
CPC ............ *H04L 25/0262* (2013.01); *H04L 1/00* (2013.01); *H04L 1/0002* (2013.01);
(Continued)

(58) Field of Classification Search
CPC . H04L 25/0262; H04L 27/0012; H04L 27/10; H04L 1/00; H04L 1/0002;
(Continued)

(56) References Cited

U.S. PATENT DOCUMENTS

| | | | |
|---|---|---|---|
| 6,760,391 B1* | 7/2004 | Alb | H04L 1/0002 375/354 |
| 2002/0080725 A1* | 6/2002 | Bradley | H04L 1/0046 370/252 |
| 2011/0158358 A1* | 6/2011 | Tseng | H04L 25/0212 375/344 |

FOREIGN PATENT DOCUMENTS

JP   4977822 B2   7/2012

OTHER PUBLICATIONS

Grimaldi et al. "Automatic Modulation Classification and Measurement of Digitally Modulated Signals", Sep. 2001, 11th IMEKO TC-4 Symp-Trends in Electrical Measurement and Instrumentation.*

(Continued)

*Primary Examiner* — Sophia Vlahos
(74) *Attorney, Agent, or Firm* — McDermott Will & Emery LLP

(57) ABSTRACT

A rate determination apparatus 1 includes a reception unit 2 configured to receive a transmission frame modulated by an FSK modulation scheme, a symbol rate detection unit 3 configured to detect a symbol rate based on a period of a preamble portion in the received transmission frame, a multilevel symbol detection unit 4 configured to detect a multilevel-modulated multilevel symbol based on a frequency deviation in the received transmission frame, and a bit rate determination unit 5 configured to determine a bit rate based on the detected symbol rate and the detected multilevel symbol. Then, the bit rate can be determined during communication.

3 Claims, 26 Drawing Sheets

(51) Int. Cl.
  *H04L 1/00*   (2006.01)
  *H04L 7/00*   (2006.01)
  *H04L 27/10*  (2006.01)
  *H04L 27/14*  (2006.01)

(52) U.S. Cl.
  CPC .............. *H04L 1/0038* (2013.01); *H04L 1/04* (2013.01); *H04L 7/00* (2013.01); *H04L 27/10* (2013.01); *H04L 27/14* (2013.01)

(58) Field of Classification Search
  CPC . H04L 1/0038; H04L 1/04; H04L 7/00; H04L 27/14; H03M 13/37
  See application file for complete search history.

(56) References Cited

OTHER PUBLICATIONS

"IEEE 802.15.4g MR-FSK Measurement Solution", Anritsu, May 2013, pp. 1-33.*

LAN/MAN Standards Committee of the IEEE Computer Society; "Part 15.4 Low-Rate Wireless Personal Area Networks (LR-WPAN's) Amendment 3: Physical Layer (PHY) Specifications for Low-Data-Rate, Wireless, Smart Metering Utility Networks"; Apr. 27, 2012; 252 pages; IEEE Std 802.15.4g, New York, New York.

\* cited by examiner

Fig. 11

| Frequency band[kHz] | COUNTRY | Mode | Modulation Scheme | Bit rate (kb/s) | Symbol rate (ksymbol/s) | Symbol Time (us) |
|---|---|---|---|---|---|---|
| 863–870 | (Europe) | 1 | 2FSK | 50 | 50 | 20 |
| | | 2 | 2FSK | 100 | 100 | 10 |
| | | 3 | 4FSK | 200 | 100 | 10 |
| 896–901 | (U.S. FCC Part 90) | 1 | 2FSK | 10 | 10 | 100 |
| | | 2 | 2FSK | 20 | 20 | 50 |
| | | 3 | 2FSK | 40 | 40 | 25 |
| 901–902 | (U.S. FCC Part 24) | 1 | 2FSK | 10 | 10 | 100 |
| | | 2 | 2FSK | 20 | 20 | 50 |
| | | 3 | 2FSK | 40 | 40 | 25 |
| 902–928 | (U.S. ISM) | 1 | 2FSK | 50 | 50 | 20 |
| | | 2 | 2FSK | 150 | 150 | 6.666666667 |
| | | 3 | 2FSK | 200 | 200 | 5 |
| 917–923.5 | (Korea) | 1 | 2FSK | 50 | 50 | 20 |
| | | 2 | 2FSK | 150 | 150 | 6.666666667 |
| | | 3 | 2FSK | 200 | 200 | 5 |
| 928–960 | (U.S. FCC Part 22/24/90/101) | 1 | 2FSK | 10 | 10 | 100 |
| | | 2 | 2FSK | 20 | 20 | 50 |
| | | 3 | 2FSK | 40 | 40 | 25 |
| 920–928 | (Japan) | 1 | 2FSK | 50 | 50 | 20 |
| | | 2 | 2FSK | 100 | 100 | 10 |
| | | 3 | 2FSK | 200 | 200 | 5 |
| | | 4 | 4FSK | 400 | 200 | 5 |

SAME SYMBOL INTERVAL
SAME SYMBOL INTERVAL

Fig. 24
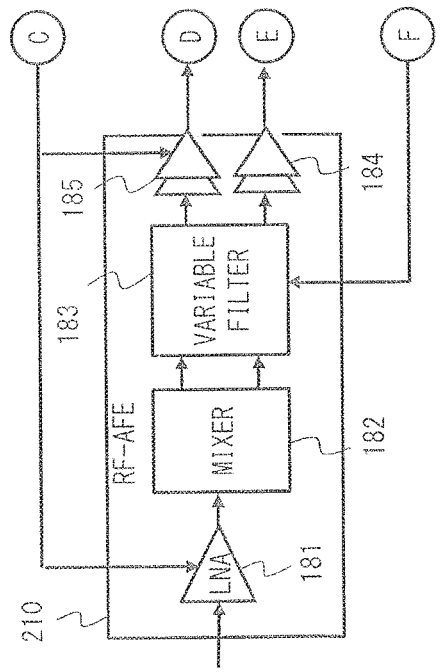
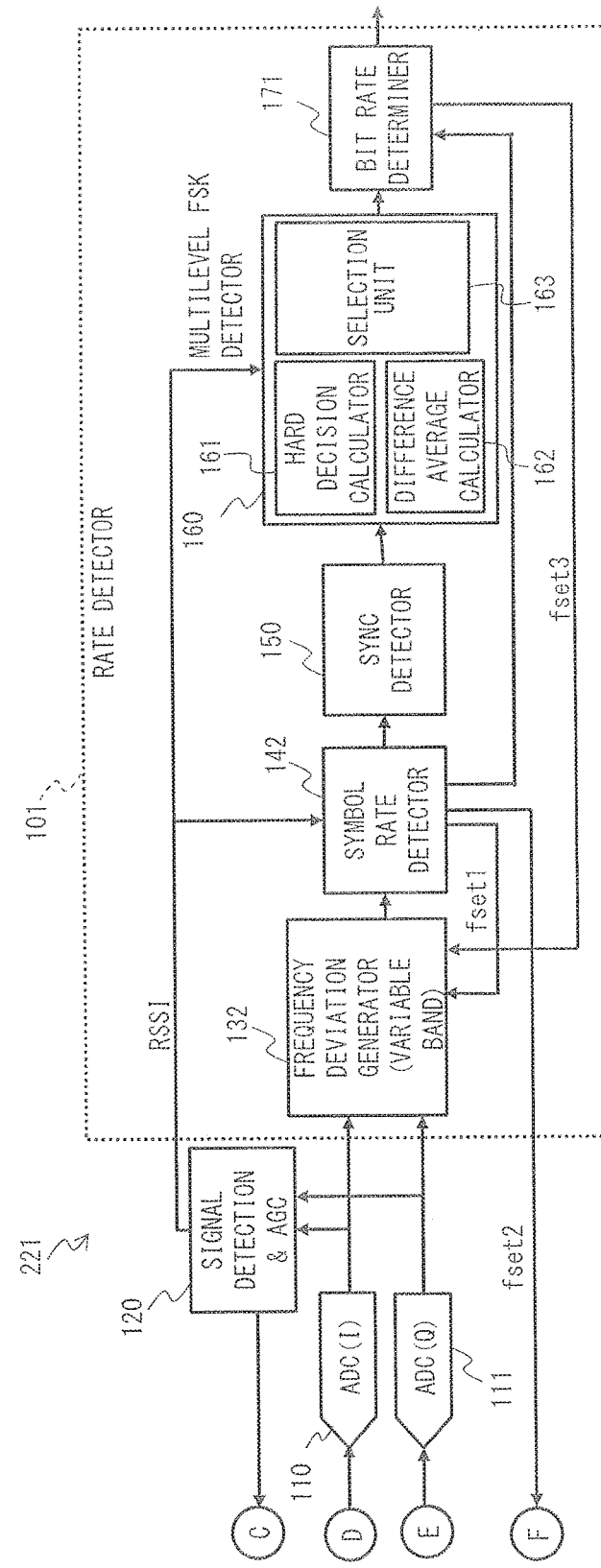

RATE DETERMINATION APPARATUS, RATE DETERMINATION METHOD, AND RECEPTION APPARATUS

CROSS-REFERENCE TO RELATED APPLICATIONS

This application is based upon and claims the benefit of priority from Japanese patent application No. 2016-241909, filed on Dec. 14, 2016, the disclosure of which is incorporated herein in its entirety by reference.

BACKGROUND

The present disclosure relates to a rate determination apparatus, a rate determination method, and a reception apparatus. The present disclosure relates to, for example, a rate determination apparatus, a rate determination method, and a reception apparatus that determine a rate of a transmission frame modulated by an FSK modulation scheme.

Recently, IoT (Internet of Things) has been drawing a great deal of attention, and systems in which various things communicate via a network such as the Internet or the like are becoming widespread. As an example, smart meters can automatically collect electricity information and the like of each home via a network.

Research on wireless communication technology for achieving such a system is in progress. For example, IEEE Std 802.15.4g (2012) (hereinafter referred to as 802.15.4g), which is a standardized wireless communication standard, employs the FSK (Frequency Shift Keying) modulation scheme for the purpose of using a smart meter and the like to enable long distance communication with low power consumption. Another known related technique is disclosed in Japanese Patent No. 4977822 (hereinafter referred to as PORCINO).

SUMMARY

With 802.15.4g and PORCINO, multiple bit rate communication can be performed by the FSK modulation scheme. However, when the bit rate is switched, it is difficult to determine a bit rate during data communication in 802.15.4g. In order to solve such a problem, PORCINO suggests a technique for determining a bit rate during data communication. However, the present inventors have found a problem that with the technique suggested by PORCINO, it is difficult to determine a multiple bit rate having a multilevel configuration in which the symbol rates are the same and the bit rates are different.

Other problems of the related art and new features of the present disclosure will become apparent from the following descriptions of the specification and attached drawings.

According to an aspect, a rate determination apparatus includes a reception unit, a symbol rate detection unit, a multilevel symbol detection unit, and a bit rate determination unit. The reception unit is configured to receive a transmission frame modulated by an FSK modulation scheme. The symbol rate detection unit is configured to detect a symbol rate based on a period of a preamble portion in the received transmission frame. The multilevel symbol detection unit is configured to detect a multilevel-modulated multilevel symbol based on a frequency deviation in the received transmission frame. The bit rate determination unit is configured to determine a bit rate based on the detected symbol rate and the detected multilevel symbol.

According to the above aspect, it is possible to determine a multilevel bit rate during data communication.

BRIEF DESCRIPTION OF THE DRAWINGS

The above and other aspects, advantages and features will be more apparent from the following description of certain embodiments taken in conjunction with the accompanying drawings, in which:

FIG. 11 is a table showing a relationship between frequency bands and data rates of various countries in IEEE 802.15.4g;

FIG. 24 is a configuration diagram showing a configuration example of a rate detector according to a third embodiment;

DETAILED DESCRIPTION

Figure 1:
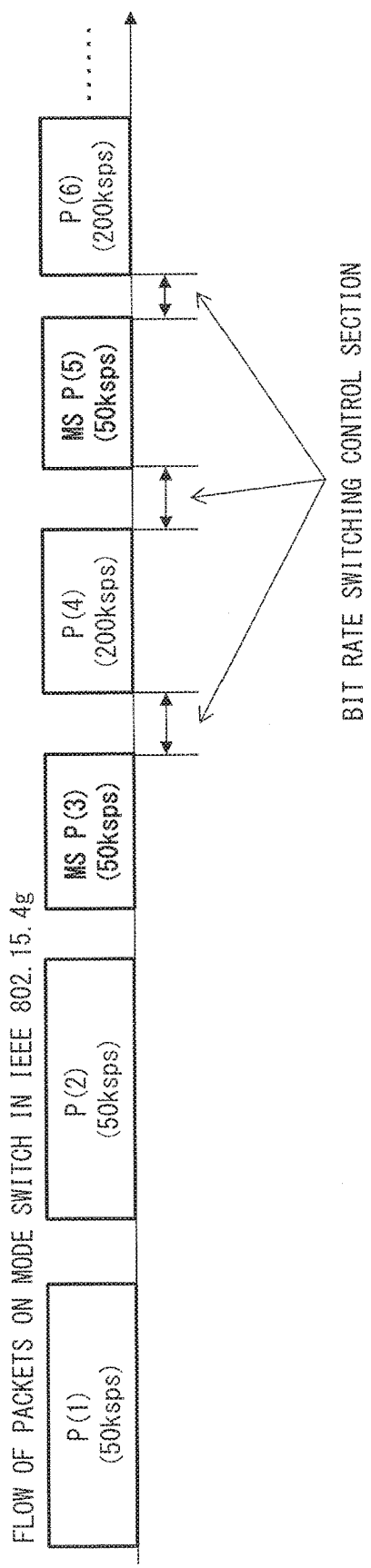
FIG. 1 is an explanatory diagram for describing a flow of packets in IEEE 802.15.4 g.

For the clarification of the description, the following description and the drawings may be omitted or simplified as appropriate. Further, each element shown in the drawings as functional blocks that perform various processing can be formed of a CPU (Central Processing Unit), a memory, and other circuits in hardware and may be implemented by programs loaded in the memory in software. Those skilled in the art will therefore understand that these functional blocks may be implemented in various ways by only hardware, only software, or the combination thereof without any limitation. Throughout the drawings, the same components are denoted by the same reference signs and overlapping descriptions will be omitted as appropriate.

Examination Leading to the Embodiments

Prior to the descriptions of the embodiments, 802.15.4g and PORCINO, which describe preconditions for the embodiments, will be examined.

FIG. 1 shows specifications employed by the FSK standard in 802.15.4g and shows a flow of packets when the mode is switched (rate is switched). Since 802.15.4g employs a multiple bit rate communication scheme that does not attach bit rate information to a transmission frame (data packets), a transmitting apparatus and a receiving apparatus need to make an agreement on a bit rate to be used before performing communication.

In this example, in order to change the bit rate from 50 ksps to 200 ksps during data communication, a Mode Switch (MS) packet P(3) is transmitted from a transmitter to a receiver. Data rate information on the next packet is attached to the Mode Switch packet P(3). The Mode Switch packet P(3) is transmitted at a predetermined rate (50 ksps), and the receiver decrypts the data and makes an optimum setting necessary for receiving the next packet.

In this processing, the bit rate is switched per packet. Thus, when a series of processing for transmitting a packet P(4) with the changed bit rate is ended, the bit rate returns to the bit rate before it is switched (50 ksps). If the bit rate is changed again, a change of the bit rate needs to be conveyed by a Mode Switch packet P(5) in a manner similar to the above case, and then the data communication by a packet P(6) is performed.

In this method, it is necessary to temporarily stop the data communication and exchange Mode Switch packets (control communication) between transmission and reception. For this reason, there is a problem that communication efficiency is lowered. Furthermore, the power consumption (transmission/reception power) increases due to the operation of the transmission and reception apparatuses for changing the bit rate.

In order to solve such a problem, the following embodiments propose a method for determining the bit rate by the receiver during the data communication without performing the control communication for changing the bit rate.

In the algorithm of PORCINO, it is possible to distinguish signals having bit rates that are multiples (doubles) of each other like 1200 kbps, 2400 kbps, and 4800 kbps (and greater multiples). However, since PORCINO targets binary FSK, the above bit rate also indicates the symbol rate. Thus, for example, in the case of binary FSK and quaternary FSK at the same symbol rates and different bit rates, the bit rates cannot be detected by this method. Therefore, this scheme cannot be used for a multiple bit rate transmission system using multilevel FSK.

In the following embodiments, a new scheme capable of detecting the bit rate even in multilevel FSK (greater than binary) with the same symbol rates and different bit rates is proposed. This scheme can be used for a multiple bit rate transmission system. Further, a scheme for efficiently detecting binary FSK bit rates is proposed.

Overview of Embodiments

Figure 2:
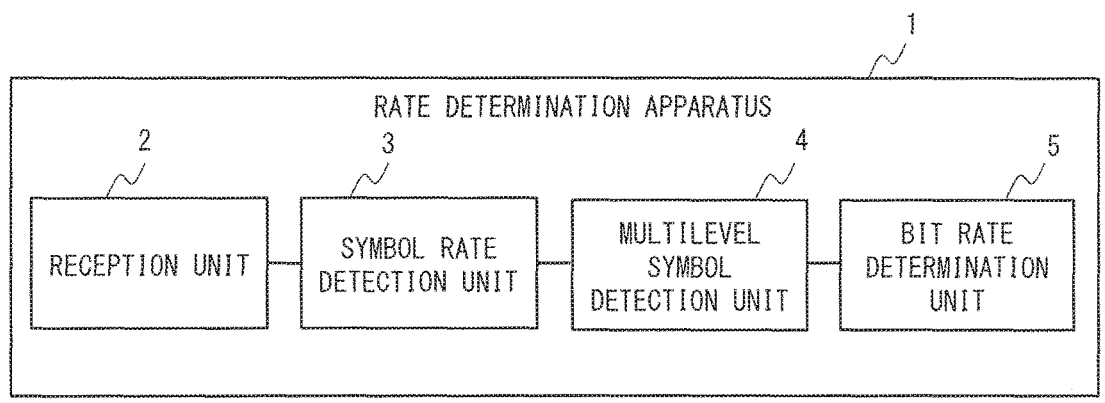
FIG. 2 is a configuration diagram showing a schematic configuration of a rate determination apparatus according to embodiments.

FIG. 2 shows an overview configuration of a rate determination apparatus according to the following embodiments. As shown in FIG. 2, the rate determination apparatus 1 according to the embodiments includes a reception unit 2, a symbol rate detection unit 3, a multilevel symbol detection unit 4, and a bit rate determination unit 5.

The reception unit 2 receives a transmission frame modulated by the FSK modulation scheme. The symbol rate detection unit 3 detects a symbol rate based on a period of a preamble portion in the received transmission frame. The multilevel symbol detection unit 4 detects multilevel symbols that have been multilevel-modulated (greater than binary) based on a frequency deviation of the received transmission frame. The bit rate determination unit 5 determines a bit rate based on the detected symbol rate and the detected multilevel symbol.

In this way, by detecting the symbol rate and the multilevel symbol from the received transmission frame and by using the detected symbol rate and multilevel symbol, the bit rate of the received transmission frame can be detected. Thus, the bit rate can be reliably detected during data communication.

First Embodiment

Hereinafter, a first embodiment will be described with reference to the drawings.
<System Configuration>

In this example, a smart meter system will be described as a system according to the first embodiment. Note that the smart meter system is an example of a system that communicates in accordance with the FSK standard in 802.15.4g, and instead other wireless communication systems may be used.

For example, a system that communicates in accordance with other multilevel FSK, which is an extended FSK standard in 802.15.4g, may be used. As the present disclosure can be adopted to an original FSK system, it can be used in many fields of technology. In particular, it is expected that the amount of data transmission will increase and the transmission methods will become diverse in smart meters, HEMS (Home Energy Management System), industrial fields, and the like. Thus, this embodiment with good communication efficiency can be effectively utilized.

Figure 3:
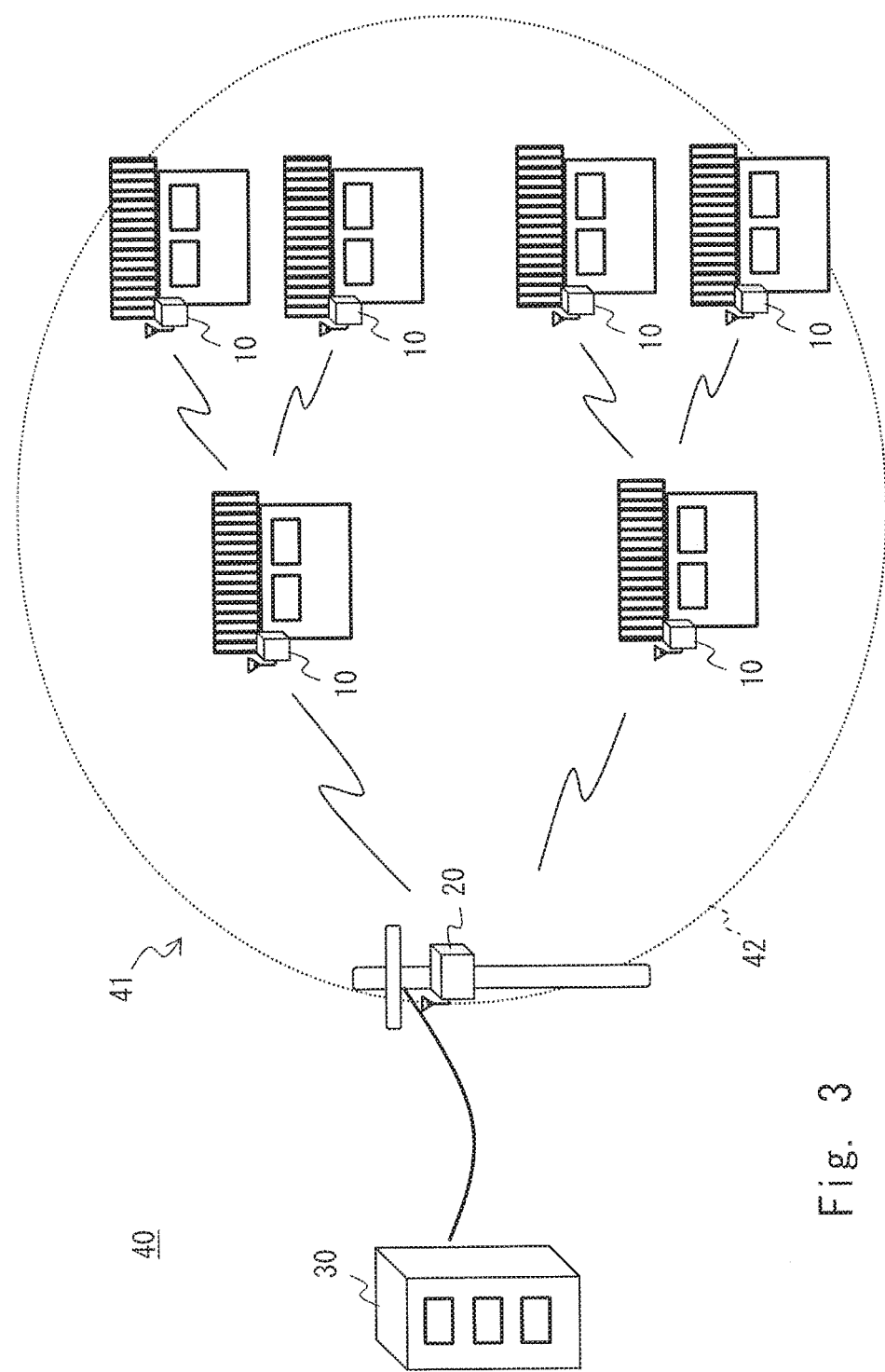
FIG. 3 is a configuration diagram showing a configuration example of a smart meter system according to a first embodiment.

FIG. 3 shows an example of the smart meter system according to this embodiment. In the example of FIG. 3, the smart meter system 40 according to this embodiment includes a plurality of smart meters 10, a gateway 20, and a server 30.

The smart meter 10 is, for example, an electricity meter installed in each home. The smart meter 10 is a wireless communication apparatus that performs wireless communication with the gateway 20 and other smart meters 10 for relaying. The smart meter 10 transmits electricity data and the like to the gateway 20 via a wireless network 41.

The gateway (gateway device) 20 is a relay device that relays communication between the smart meters 10 and the server 30. The gateway 20 transfers instructions and the like from the server 30 to the smart meters 10 and transfers data and the like from the smart meter 10 to the server 30. The server 30 is connected to the gateway 20 via a wired network or the like. The server 30 is a management device that collects the electricity data and the like from the plurality of smart meters 10 via the gateway 20 and manages the electricity data and the like.

The smart meters 10 and the gateway 20 perform wireless communication in accordance with the FSK standard in 802.15.4g. The plurality of smart meters 10 and the gateway 20 constitute a wireless network 41, for example, a wireless tree network (star network). Other network topologies such as a mesh network may be constituted.

In this example, this embodiment is applied to the entire area 42 of the wireless network 41. That is, all the smart meters 10 and gateway 20 constituting the wireless network 41 each implement a receiver including a rate detector according to this embodiment, which will be described later. By applying the rate detector according to this embodiment to all the smart meters 10 and gateway 20, it is possible to omit communication necessary for changing the bit rate and to change the transmission rate according to the situation. Accordingly, the communication efficiency can be improved. Further, it is possible to reduce the power consumption of all the devices.

Figure 4:
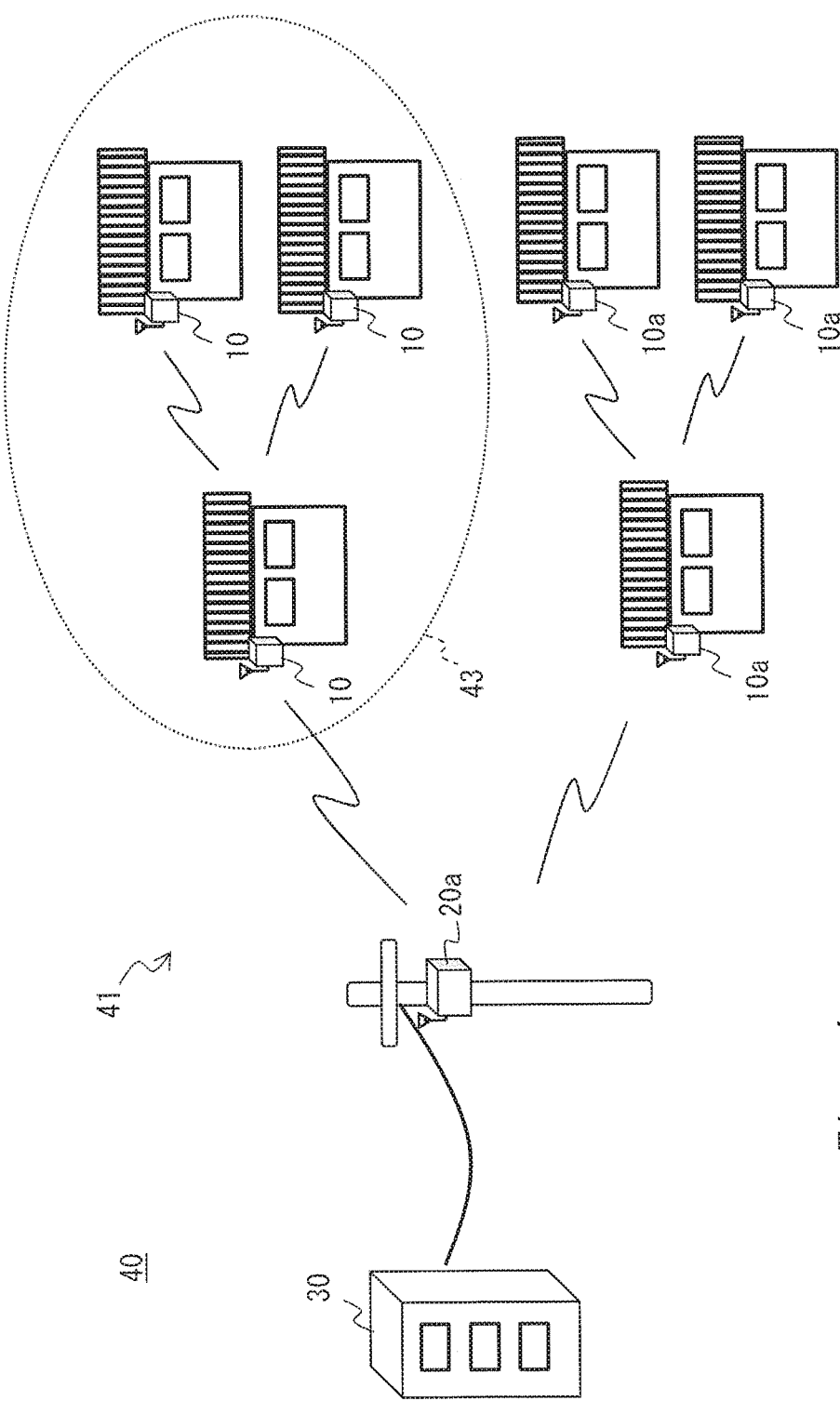
FIG. 4 is a configuration diagram showing another configuration example of the smart meter system according to the first embodiment.

FIG. 4 shows another example of the smart meter system according to this embodiment. As shown in FIG. 4, this embodiment may be applied to some of the devices in a wireless network. In the smart meter system 40 of FIG. 4, a gateway 20a, a plurality of smart meters 10, and a plurality of smart meters 10a constitute a wireless network 41.

In this example, the rate detector according to this embodiment is applied to the smart meters 10 in a part of the area 43 (a part of the network) of the wireless network 41. This embodiment is not applied to the smart meters 10a and the gateway 20a in another area (another network). The gateway 20a and the smart meters 10 can communicate with each other in accordance with the 802.15.4g standard.

The rate is switched using Mode Switch packets in accordance with the 802.15.4g standard in an area to which this embodiment is not applied, for example, between the gateway 20a and the smart meters 10a. That is, the gateway 20a and the smart meters 10a can communicate in accordance with the existing 802.15.4g standard. Further, by applying this embodiment, it is possible to omit communication necessary for changing the bit rate among the smart meters 10 in the area 43 and to change the transmission rate according to the situation. Accordingly, the communication efficiency be improved. Further, it is possible to reduce the power consumption of the devices in the area 43.

<Configuration of Smart Meter and Gateway>

Figure 5:
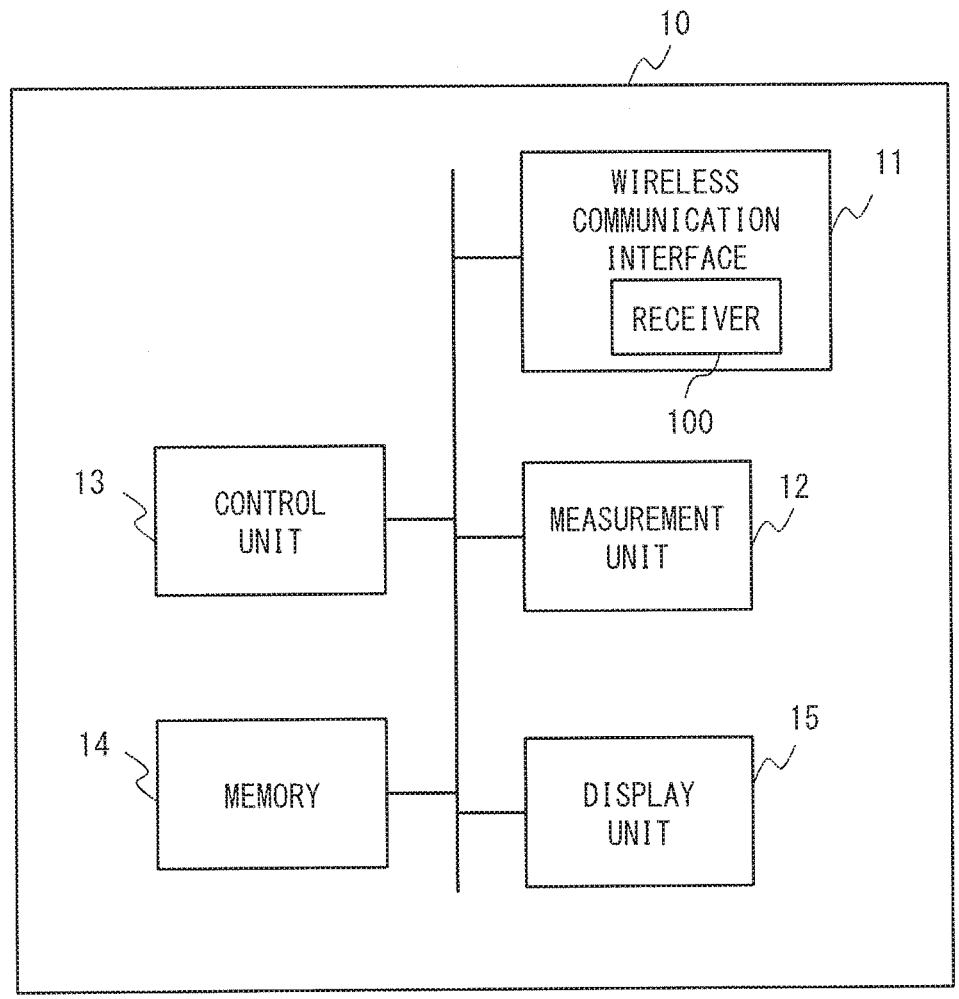
FIG. 5 is a configuration diagram showing a configuration example of a smart meter according to the first embodiment.

FIG. 5 shows a configuration example of the smart meter 10 according to this embodiment shown in FIGS. 3 and 4. As shown in FIG. 5, the smart meter 10 according to this embodiment includes a wireless communication interface 11, a measurement unit 12, a control unit 13, a memory 14, and a display unit 15.

The wireless communication interface 11 is an interface for performing wireless communication with the gateway 20 and other relaying smart meters 10. The wireless communication interface 11 is capable of communication conforming to the 802.15.4g standard. The wireless communication interface 11 includes a receiver 100 including a rate detector according to this embodiment.

The measurement unit 12 is, for example, an electricity meter for measuring the amount of electricity. The measurement unit 12 may be a sensor or the like for obtaining data other than the amount of electricity. The memory 14 stores a control program, data, and the like necessary for the operation of the smart meter 10.

The control unit 13 executes the control program stored in the memory 14 to control operations of the measurement unit 12 and the wireless communication interface 11 and to store data in the memory 14. For example, the control unit 13 obtains the amount of electricity from the measurement unit 12 in accordance with a message (packets) received by the wireless communication interface 11 and transmits the data of the obtained amount of electricity from the wireless communication interface 11. The display unit 15 is an example of a user interface and displays the amount of electricity and the like measured by the measurement unit 12 for the user.

Figure 6:
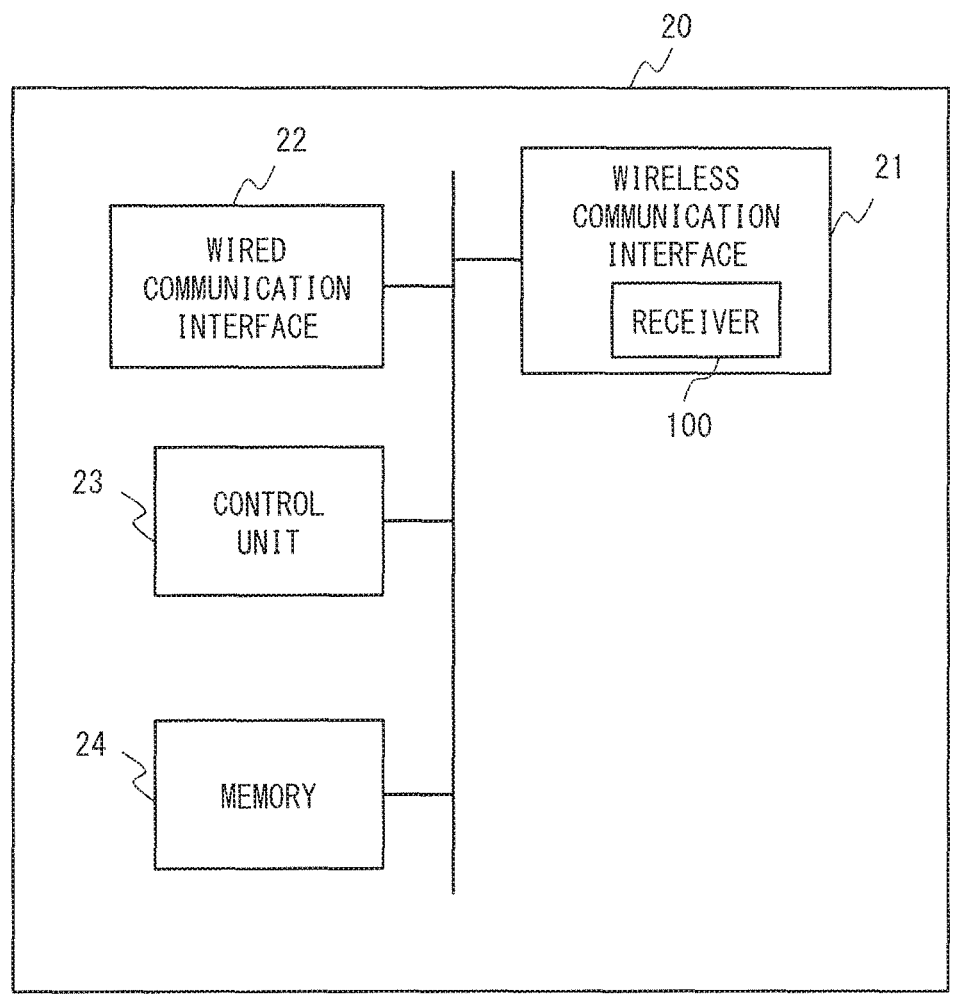
FIG. 6 is a configuration diagram showing a configuration example of a gateway according to the first embodiment.

FIG. 6 shows a configuration example of the gateway 20 according to this embodiment shown in FIG. 3. As shown in FIG. 6, the gateway 20 according to this embodiment includes a wireless communication interface 21, a wired communication interface 22, a control unit 23, and a memory 24.

The wireless communication interface 21 is an interface for performing wireless communication with the smart meters 10. Like the wireless communication interface 11 of the smart meter 10, the wireless communication interface 21 is capable of communication conforming to the 802.15.4g standard. The wireless communication interface 11 includes a receiver 100 including a rate detector according to this embodiment.

The wired communication interface 22 is an interface for performing wired communication with the server 30. Note that the gateway 20 and the server 30 may not only perform wired communication but also perform wireless communication. The memory 24 stores a control program, data, and the like necessary for the operation of the gateway 20.

The control unit 23 executes the control program stored in the memory 24 to control operations of the wireless communication interface 21 and the wired communication interface 22 and to store data in the memory 24. For example, the control unit 23 performs a relay (transfer) process necessary for relaying the communication of the wireless communication interface 21 and the communication of the wired communication interface 22.

<Configuration of Receiver>

Figure 7:
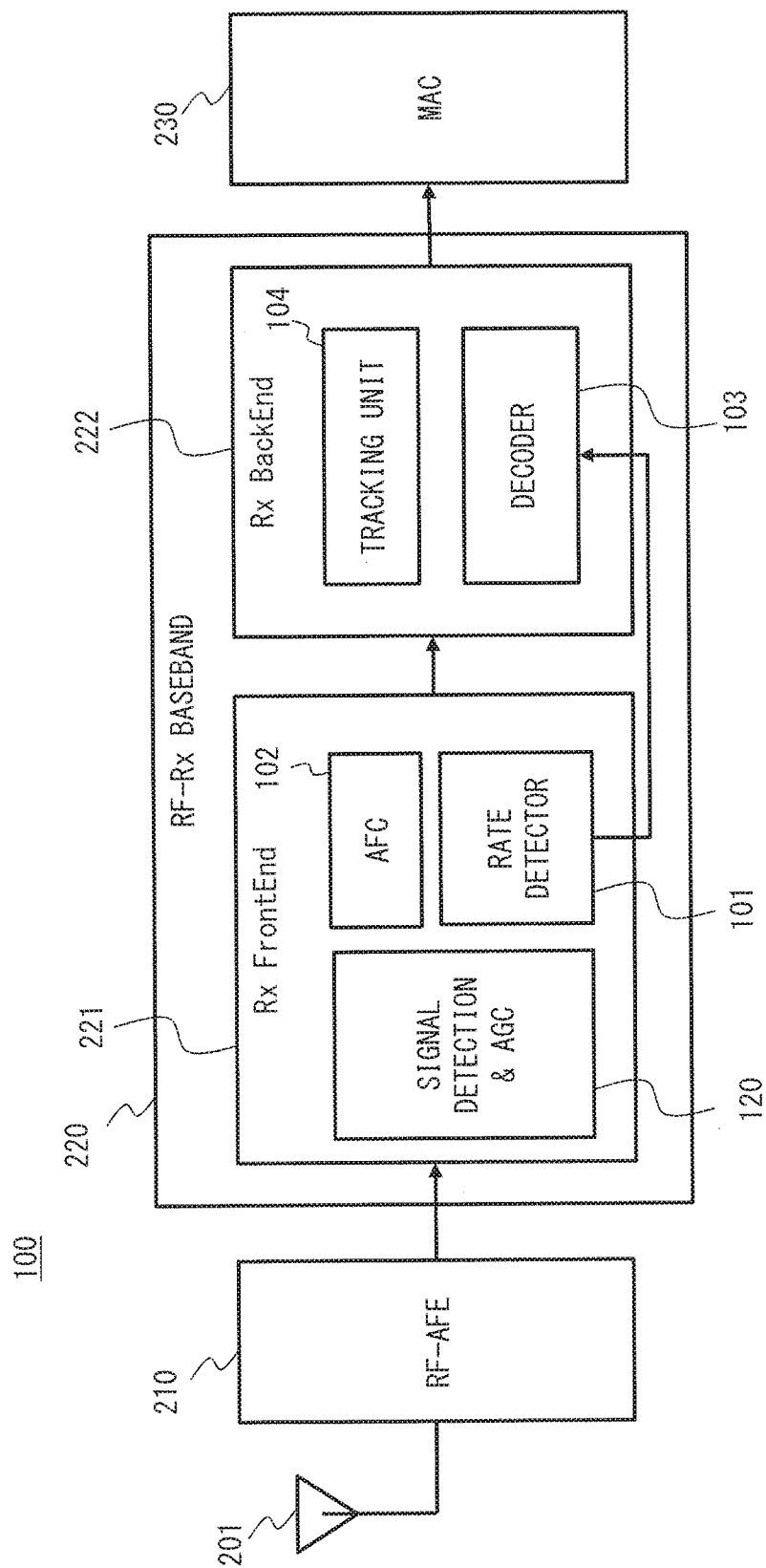
FIG. 7 is a configuration diagram showing a configuration example of a receiver according to the first embodiment.

FIG. 7 shows a configuration example of the receiver 100 according to this embodiment. As shown in FIGS. 5 and 6, the receiver 100 is mounted on the smart meter 10 and the gateway.

As shown in FIG. 7, the receiver 100 according to this embodiment includes an antenna 201, an RF-AFE (Analog Front End) unit 210, an RF-Rx BASEBAND unit (RF reception baseband unit) 220, and a MAC processing unit 230. The RF-AFE unit 210, the RF reception baseband unit 220, and the MAC processing unit 230 may be separate semiconductor devices (semiconductor chips) or a single semiconductor device.

The RF-AFE unit (reception unit, RF signal processing unit) 210 processes an analog received signal (RF signal) received via the antenna 201 and outputs a signal (baseband signal) that can be processed by the RF reception baseband unit 220. For example, the RF-AFE unit 210 performs signal processing such as amplification by a low-noise amplifier and down-conversion by a mixer.

The RF reception baseband unit (baseband signal processing unit) 220 decodes the received signal processed by the RF-AFE unit 210 into a bit string (packets) and outputs the decoded bit string to the MAC processing unit 230. The MAC processing unit 230 performs MAC processing on the received signal (packet) decoded by the RF reception baseband unit 220. The MAC processing unit 230 analyzes the packet included in the received signal and executes processing corresponding to the packet in accordance with the MAC protocol.

The RF reception baseband unit 220 includes an Rx FrontEnd unit (reception front end unit) 221 that performs pre-processing of baseband processing and an Rx BackEnd unit (reception backend unit) 222 that performs post-processing of the baseband processing.

The reception front end unit 221 includes a signal detection & AGC (Automatic Gain Control) unit 120, an AFC (Automatic Frequency Control) unit 102, and a rate detector 101. The signal detection & AGC unit 120 detects the received signal and performs automatic gain control so that the received signal becomes a signal of a constant level. The AFC unit 102 performs automatic frequency control in order to stabilize the frequency of the received signal.

The rate detector 101 has main features of this embodiment. The rate detector 101 detects a symbol rate and a bit rate from the FSK-modulated received signal as described later. The rate detector 101 outputs information on the detected bit rate (and symbol rate) to the decoder 103.

The reception back end unit 222 includes a tracking unit 104 and a decoder 103. The tracking unit 104 tracks the frequency of the received signal to perform FSK demodulation and outputs the frequency to the decoder 103. The decoder 103 decodes the received signal into a bit string (packets) based on the frequency and bit rate (and symbol rate) of the received signal. The decoder 103 outputs the decoded bit string to the MAC processing unit 230.

<Frame Structure>

Figure 8:
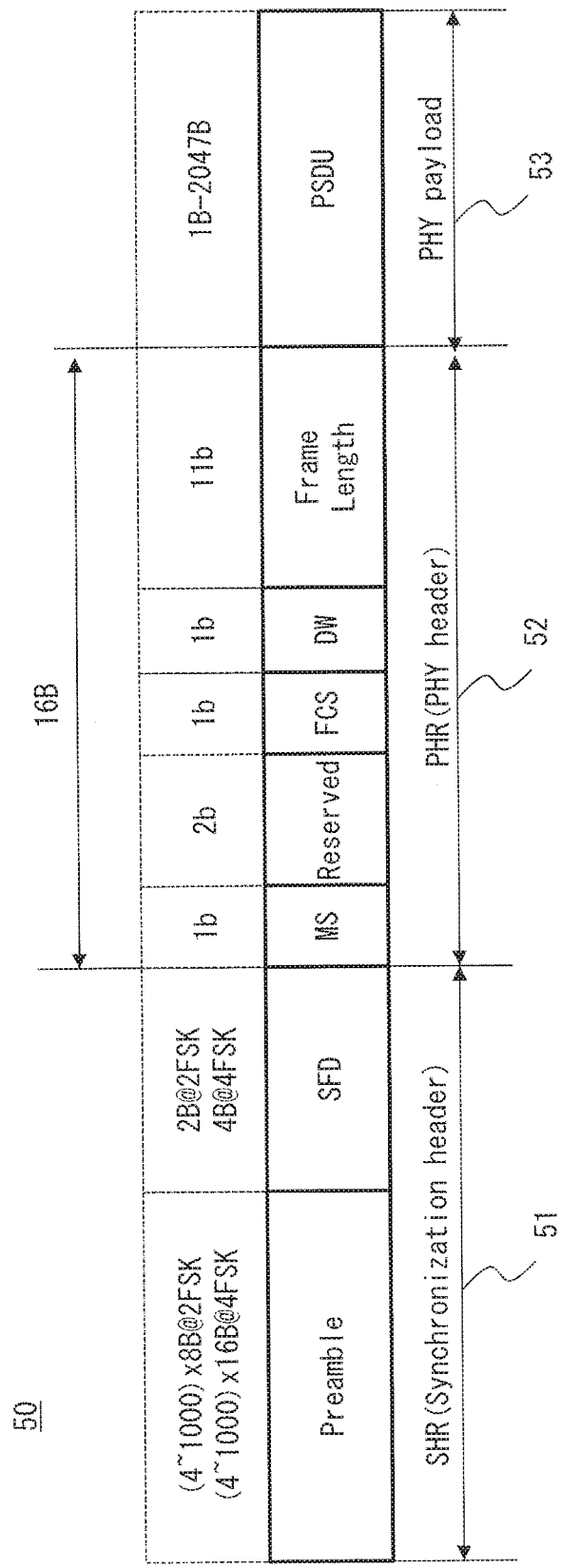
FIG. 8 is a configuration diagram showing a configuration of a frame in IEEE 802.15.4g.

In this embodiment, the FSK modulation scheme of the 802.15.4g standard is employed as an example. FIG. 8 shows a structure of a FSK frame (transmission frame) 50 of the 802.15.4g standard. FIG. 8 shows an example of packets (data packets) for transmitting data. An FSK frame 50 includes an SHR (synchronization header) portion 51, a PHR (PHY header) portion 52, and a PHY payload portion 53.

The SHR portion 51 is a synchronization header and includes a preamble portion and an SFD portion for synchronization detection. In the case of 2FSK, 0101-0101 (8 bit sequence) is set in the preamble portion, and in the case of 4FSK, 0111-0111-0111-0111 (16 bit sequence) is set in the preamble portion. It is defined that the SHR portion 51 including the preamble portion and the SFD portion is modulated with a binary frequency (same as 2FSK) of a minimum frequency deviation (−fdev) and a maximum frequency deviation (+fdev) regardless of the number of FSK symbols. That is, the SHR portion 51 including the preamble portion is FSK-modulated with a binary, and the other portions, i.e., the PHR portion 52 and the PHY payload portion 53 (multilevel modulation unit), are multilevel-modulated with a binary or higher order values.

The PHR portion 52 is a physical header to which processing information on the packets is attached. The PHR portion 52 includes an MS (Mode Switch control) portion, a Reserved portion, an FCS (CRC type) control portion, a DW (Data Whitening) control portion, a Frame Length (data length) setting portion.

When a data packet is transmitted, 0 is set in the MS portion. A length of an FCS field is set in the FCS setting portion. When data is whitened (scrambled), 1 is set in the DW portion, whereas when data is not whitened, 0 is set in the DW portion. A length of PSDU is set in the Frame Length setting portion. The PHY payload portion 53 includes a PSDU portion to which data information is attached.

As shown above, the FSK frame (transmission frame) 50 that transmits data does not include a transmission data rate (bit rate) setting portion. Therefore, in the 802.15.4g standard, it is necessary to set in advance a bit rate at which communication is performed between transmission and reception. In this regard, in this embodiment, the bit rate can be switched during data communication by utilizing the following features.

Figure 9:
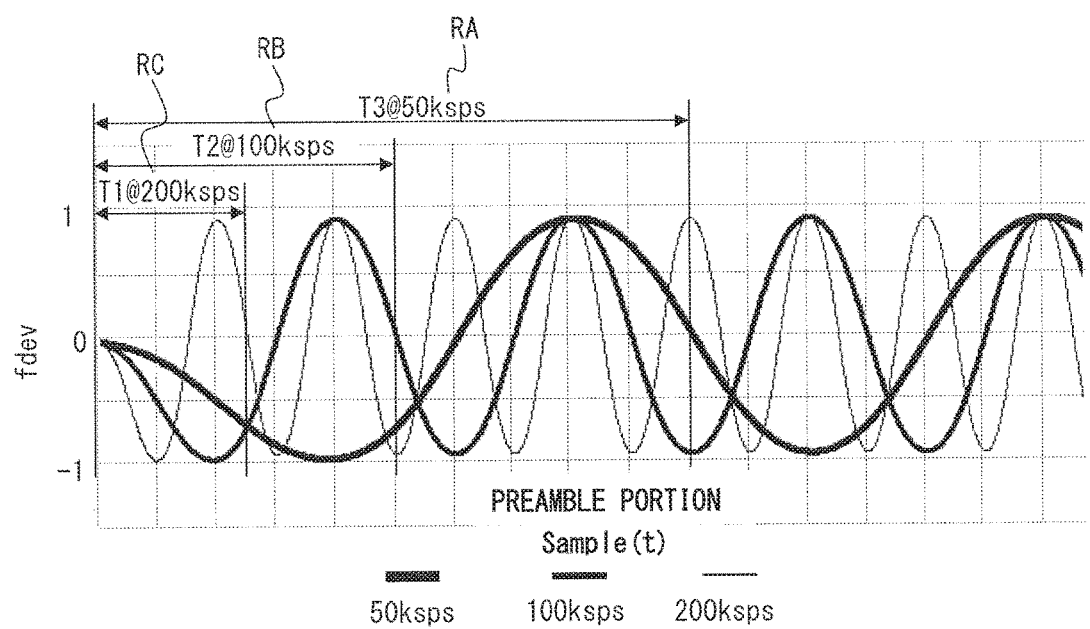
FIG. 9 is a waveform diagram showing an example of a signal waveform of a preamble portion in IEEE 802.15.4g.

FIG. 9 shows frequency properties of the preamble portion for, for example, three symbol rates (RA: 50 ksps, RB: 100 ksps, and RC: 200 ksps). As shown in FIG. 9, as the cycle differs for each symbol rate, at least the symbol rate can be detected if the cycle can be detected near the beginning of the received packets (frame).

Figure 10:
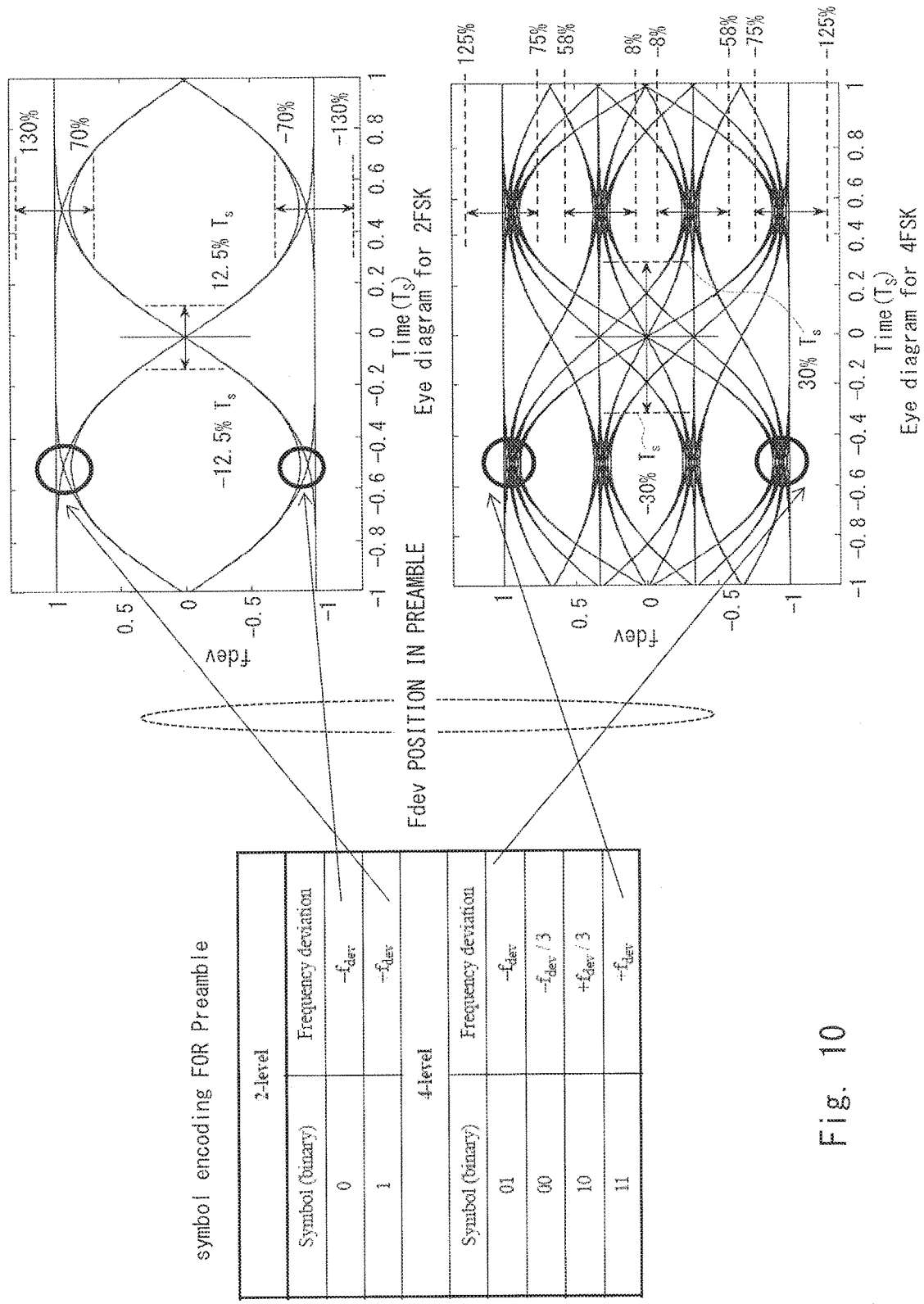
FIG. 10 is an explanatory diagram for describing a relationship between a modulation scheme of IEEE 802.15.4g and an eye diagram.

On the other hand, in the multilevel FSK, a plurality of bits are propagated by one symbol. Thus, even if the symbol rate can be detected, the bit rate cannot be reliably detected. As described above, the preamble portion is defined as a binary frequency of the minimum frequency deviation (−fdev) and the maximum frequency deviation (+fdev). For example, as shown in FIG. 10, both binary (2level: 2FSK) and quaternary (4level: 4FSK) include the same frequency (−fdev and +fdev). Therefore, it is not possible to distinguish whether the symbol is binary (2FSK) or quaternary (4FSK) only by detecting the frequency of the preamble portion.

FIG. 11 is a table showing a relationship between frequency bands and data rates of various countries in 802.15.4g. For example, in Japan, in the case of 200 ksps, 2FSK and 4FSK can be used. With 200 ksps in 2FSK, the bit rate is 200 kbps, and with 200 kbps in 4FSK, the bit rate is 400 kbps. That is, since the symbol interval (symbol rate) is the same, even if the symbol rate of 200 ksps can be detected, it is not possible to detect whether the bit rate is 200 kbps or 400 kbps unless the modulation scheme of either 2FSK or 4FSK can be determined.

Likewise, in Europe, in the case of 100 ksps, 2FSK and 4FSK can be used. With 100 ksps in 2FSK, the bit rate is 100 kbps, and with 100 kbps in 4FSK, the bit rate is 200 kbps. That is, since the symbol interval (symbol rate) is the same, even if the symbol rate of 100 ksps can be detected, it is not possible to detect whether the bit rate is 100 kbps or 200 kbps unless the modulation scheme of either 2FSK or 4FSK can be determined.

Figure 12:
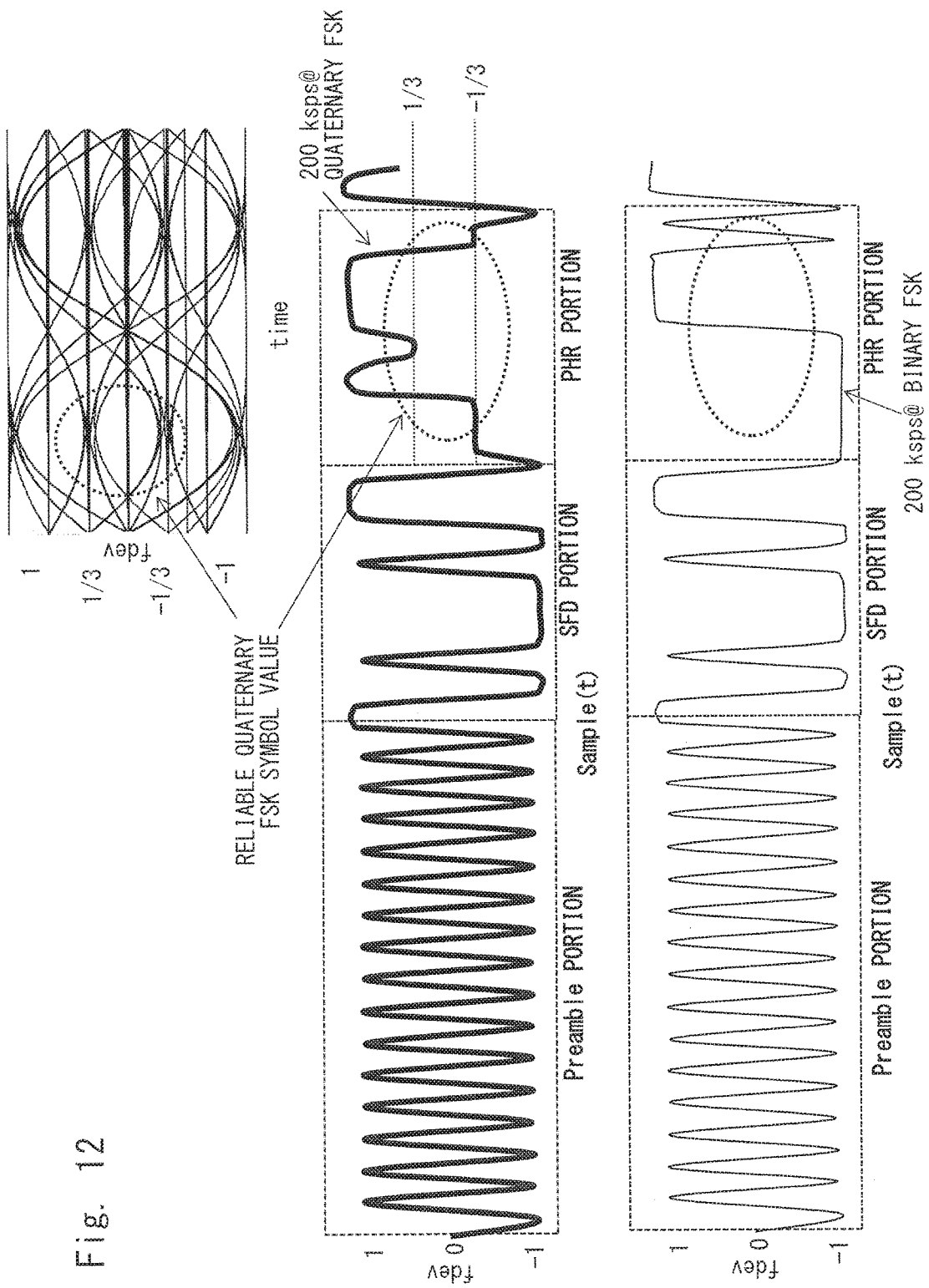
FIG. 12 is a waveform diagram showing an example of a signal waveform of a PHR part in IEEE 802.15.4g.

FIG. 12 shows an example of signal waveforms of the preamble portion, the SFD portion, and the PHR portion in the FSK frame. As described above, in the preamble portion and the SFD portion, the bit rate cannot be accurately determined. In this embodiment, for the binary FSK and quaternary FSK having the same symbol rate, a determination of whether or not the bit rate is a quaternary FSK bit rate is performed at a position (PHR portion) where a reliable quaternary FSK symbol is present. This makes it possible to reliably detect multilevel FSK (multilevel symbol) and to determine the bit rate. As described above, the PHR portion includes the MS portion, the Reserved portion, the FCS setting portion, the DW control portion, and the Frame Length setting portion.

<Configuration of Rate Detector>

Figure 13:
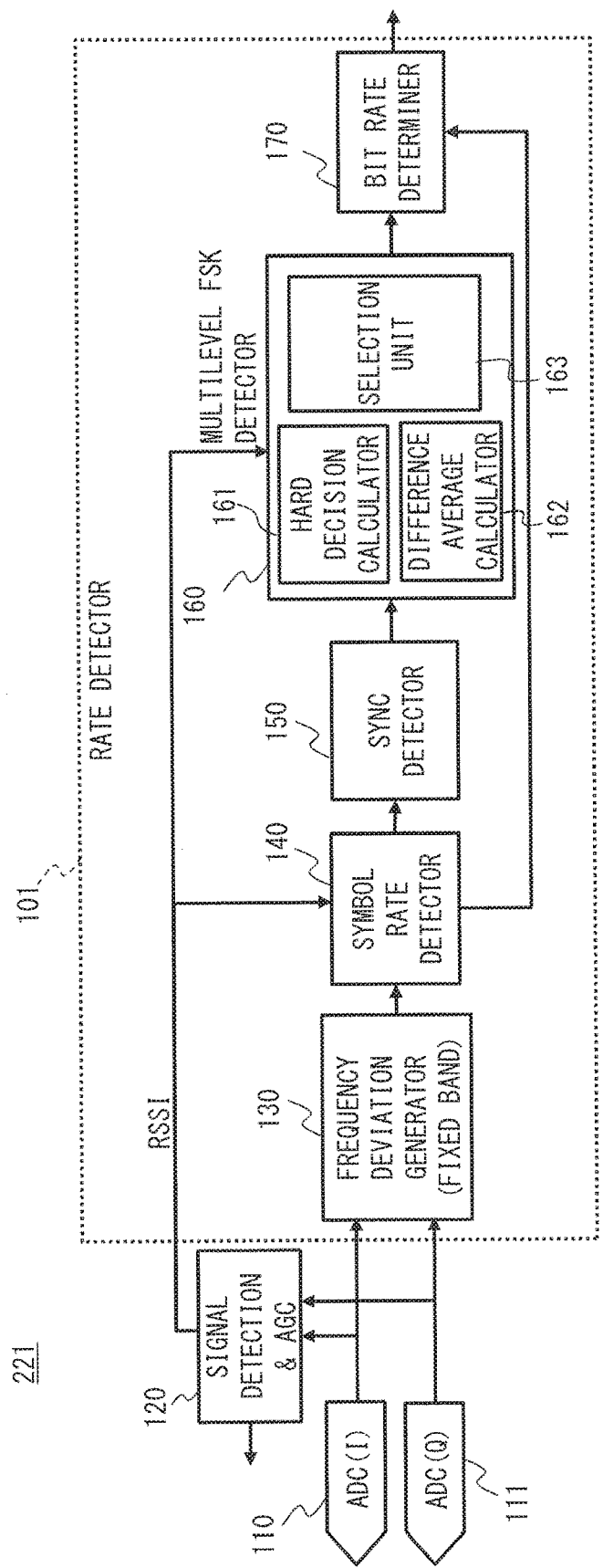
FIG. 13 is a configuration diagram showing a configuration example of a rate detector according to the first embodiment.

FIG. 13 shows a configuration example of the rate detector according to this embodiment. The rate detector 101 enables the determination of the bit rate by utilizing the above-described features of the FSK modulation scheme.

The reception front end unit 221 of the RF reception baseband unit 220 shown in FIG. 7 includes the signal detection & AGC unit 120 and the rate detector 101. The reception front end unit 221 further includes an ADC (AD Converter for I signals) 110 and an ADC (AD Converter for Q signals) 111 for AD conversion of received signals. The ADCs 110 and 111 may be provided inside the RF reception baseband unit 220 or may be provided outside the RF reception baseband unit 220. The signal detection & AGC unit 120 performs signal detection and gain control on the AD-converted I and Q signals. The signal detection & AGC unit 120 also detects signal strength (RSSI) of the received signal.

As shown in FIG. 13, the rate detector 101 according to this embodiment includes a frequency deviation generator (fixed band) 130, a symbol rate detector 140, a Sync detector 150, a multilevel FSK detector 160, and a bit rate determiner 170.

The frequency deviation generator 130 generates a predetermined frequency deviation (frequency deviation value) from the received signal. The frequency deviation generator 130 is, for example, a filter that defines the frequency deviation of the received signal within a preset frequency range. In this embodiment, a fixed band (cutoff frequency) is set in the frequency deviation generator 130. By setting a frequency greater than the maximum symbol rate as the cutoff frequency, this embodiment can be achieved by one filter.

The symbol rate detector 140 detects the symbol rate of the received signal based on the preamble portion of the received signal. The symbol rate detector 140 detects the symbol rate by performing zero-crossing point detection in which the symbol period is detected from a time interval of changing point (zero-crossing point) in the sign of the frequency deviation value and cross-correlation detection with a predetermined pattern (periodic pattern). The symbol rate can be easily detected by detecting the symbol rate based on the zero-crossing point. The symbol rate can be accurately detected by detecting the symbol rate based on the cross-correlation detection. By detecting the symbol rate using one of these methods, the symbol rate can be detected by an appropriate method. Further, by selecting one of the methods according to the RSSI, the symbol rate can be detected by the method according to the reception situation. The determination of the magnitude of the RSSI is based on the vicinity of the reception sensitivity at which reception performance begins to deteriorate due to the influence of noise. When the RSSI is small, the cross-correlation detection that is capable of accurately detecting the symbol rate in the noisy environment is performed. When the RSSI is large, the zero-crossing point detection that is capable of easily detecting the symbol rate is performed. In this way, the symbol rate can be detected by the most appropriate method.

After the symbol rate is detected, the Sync detector 150 establishes synchronization based on the synchronization header of the received signal.

After the synchronization is established, the multilevel FSK detector (multilevel symbol detection unit) 160 detects a multilevel symbol (multilevel FSK) based on the frequency deviation of the received signal. In this embodiment, the multilevel FSK detector 160 detects the multilevel symbol by performing hard decision calculation or difference average calculation.

The multilevel FSK detector 160 includes a hard decision calculator 161, a difference average calculator 162, and a selection unit 163. The hard decision calculator 161 makes a hard decision on the frequency deviation of the received signal. By detecting the multilevel symbol based on a result of the hard decision, the multilevel symbol can be easily detected. Moreover, by making the hard decision on an absolute value of the frequency deviation of the received signal, the multilevel symbol can be detected more simply.

The difference average calculator 162 calculates a difference average between the frequency deviation of the received signal and a specific pattern (frequency deviation pattern corresponding to the multilevel symbol). The difference average calculator 162 obtains at least a difference between the received signal and the specific pattern and further obtains an average of the differences between the symbols. By detecting the multilevel symbol based on the difference or the difference average, the multilevel symbol can be reliably detected. Further, as will be described later, by detecting the multilevel symbol based on a route having the smallest difference average among a plurality of routes (frequency deviation routes) included in the specific pattern, the multilevel symbol can be detected based on an optimum route even when there are a large number of routes. The absolute value of the frequency deviation of the plurality of routes is defined as the specific pattern and a pattern folded back at the symbol (the routes between the first and second symbols and the routes between the second and the third symbols are folded back at the second symbol) is defined as the specific pattern. By doing so, the amount of the information prepared (stored) in advance can be reduced.

The selection unit 163 selects the hard decision calculation or the difference average calculation. By detecting the multilevel symbol using one of the methods, the symbol rate can be detected by an appropriate method. Further, by selecting one of the methods according to the RSSI, the multilevel symbol can be detected by the method according to the reception situation. In particular, when the RSSI is small, the difference average calculation is performed, while when the RSSI is large, the hard decision calculation is performed. In this way, the multilevel symbol can be detected by the most appropriate method.

The bit rate determiner 170 determines (detects) the bit rate of the received signal based on results of the symbol rate detection and the multilevel symbol detection.

<Operation of Rate Detector>

Figure 14A:
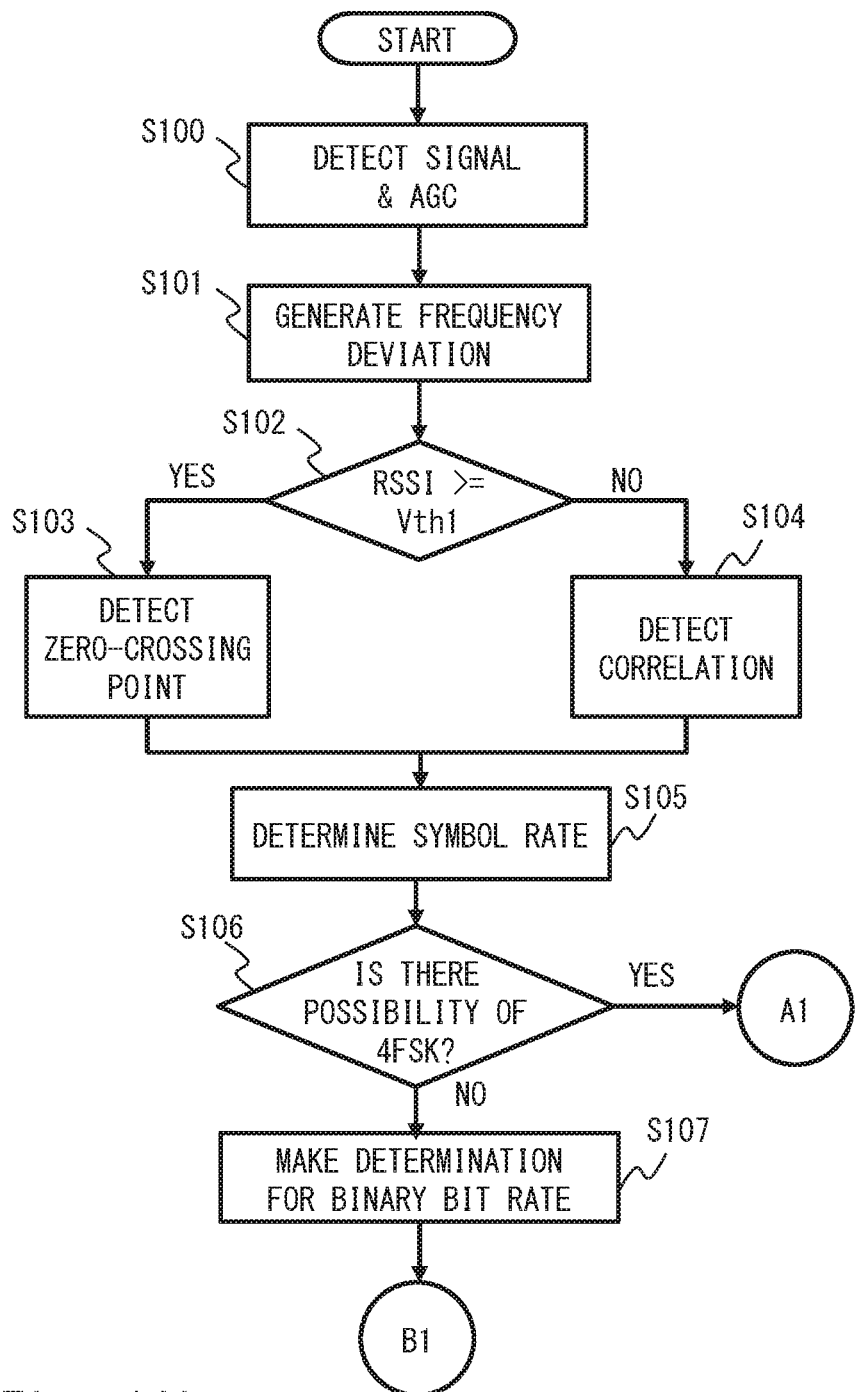
FIG. 14A is a flowchart showing an operation example of the rate detector according to the first embodiment.
Figure 14B:
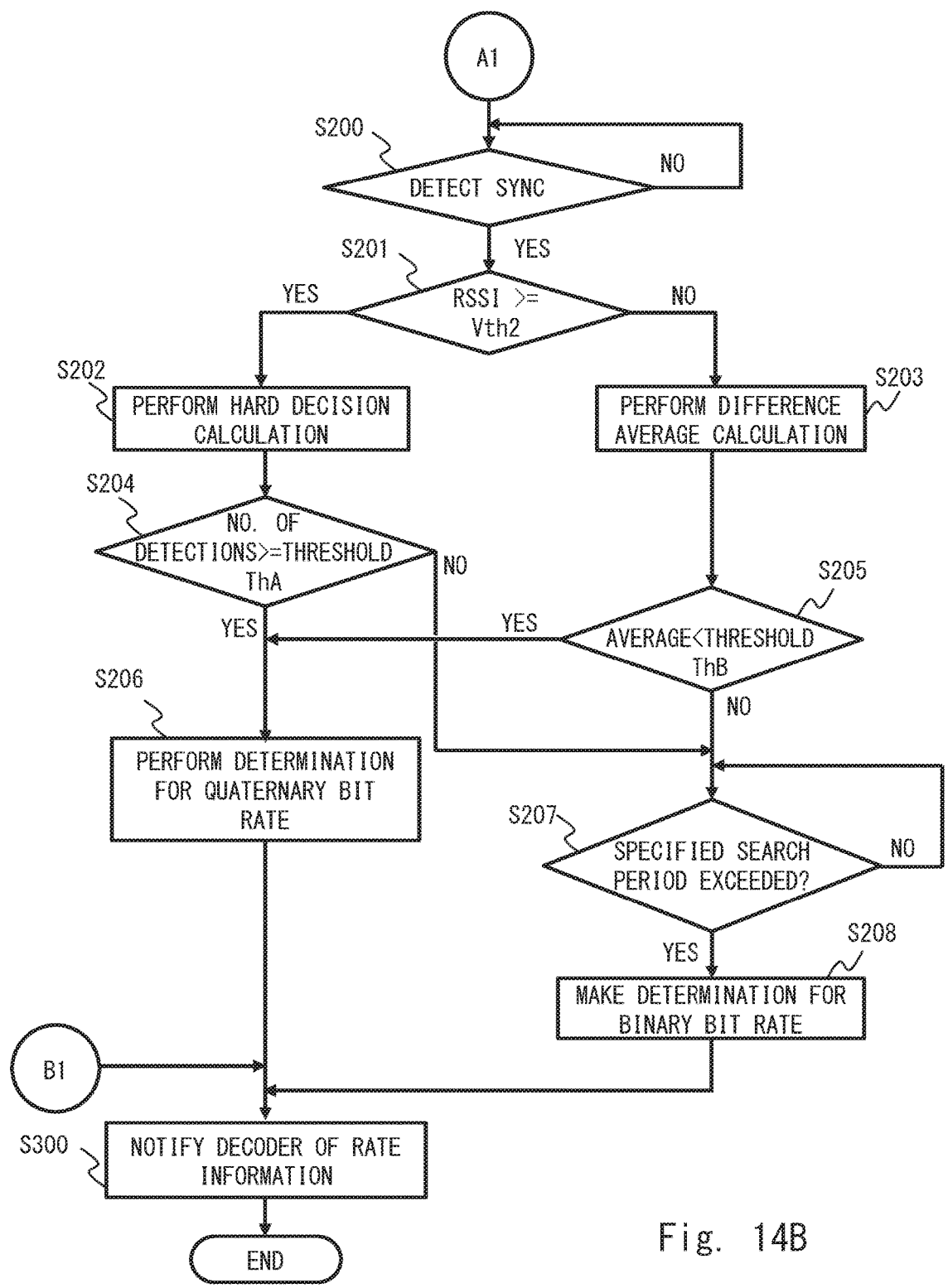
FIG. 14B is a flowchart showing an operation example of the rate detector according to the first embodiment.

The flowcharts of FIGS. 14A and 14B show an operation of the configuration according to this embodiment shown in FIG. 13. As shown in FIGS. 14A and 14B, firstly, the signal detection & AGC unit 120 performs signal detection and gain control on an output signal (signal I) of the ADC 110 and an output signal (signal Q) of the ADC 111 (S100)

Next, the band-fixed frequency deviation generator 130 filters the output signal (signal I) of the ADC 110 and the output signal (signal Q) of the ADC 111 to generate a frequency deviation value for each sample. Then, the symbol period appears (S101). For example, when the data rates shown in FIG. 9 can be received, a cutoff frequency that can cover the maximum symbol rate (RC: 200 ksps) is set in the reception filter (frequency deviation generator 130).

Next, using the received signal strength (RSSI) required by the signal detection & AGC unit 120, the method of detecting the symbol rate is selected with reference to the vicinity of the reception sensitivity (Vth1) at which the reception performance begins to deteriorate due to the influence of noise (S102). When the RSSI is less than a certain threshold value (Vth1) (a condition that the reception sensitivity is poor), the symbol rate detector 140 performs the cross-correlation detection (S104) to thereby increase the determination accuracy. While when the RSSI exceeds the threshold value (Vth1) (a condition that the reception sensitivity is good), the zero-crossing point detection is performed (S103), so that the amount of calculation is reduced to determine the symbol rate (S105). Note that the symbol rate may be determined by selecting one of or combining the zero-crossing point detection and the cross-correlation detection.

The symbol rate detector 140 inputs the frequency deviation value for each sample and detects the zero-crossing points of the frequency deviation of the period in the preamble portion having the known pattern (S103). Then, the symbol rate detector 140 determines the symbol period and the symbol rate from intervals of the detected zero-crossing points. Further, the symbol rate detector 140 performs the cross-correlation detection in the preamble portion (S104), calculates a cross-correlation value between expected symbol rates (symbol rates RA, RB, and RC) to detect intervals of the periods, and determines the symbol rate from the detected symbol periods.

Next, the symbol rate detector 140 evaluates as to whether or not there is a possibility of 4FSK from the determined symbol rate (S106). When the symbol rate determined in S105 is 50 ksps or 100 ksps, which is irrelevant to the quaternary FSK, it is evaluated that the bit rate is the binary FSK bit rate (there is no possibility of 4FSK), and the bit rate determiner 170 performs a determination for a binary bit rate (S107).

On the other hand, when the symbol rate determined by the symbol rate detector 140 in S105 is 200 ksps, which indicates a possibility of quaternary FSK, after the synchronization is detected by the Sync detector 150 (S200), the multilevel FSK detector 160 performs a determination at a position where the reliable quaternary FSK is present.

The selection unit 163 may specify one of the detection methods in advance or may combine arbitrary detection methods. In this example, the detection method of the multilevel FSK symbol is switched according to the RSSI (S201). When the RSSI is less than a certain threshold (Vth2) (a condition that reception sensitivity is poor), the selection unit 163 selects the difference average determination method to thereby increase the determination accuracy (S203). While when the RSSI exceeds the threshold value (Vth2) (a condition that the reception sensitivity is good), the hard decision method (S202) is selected to determine the rate, so that the amount of calculation is reduced.

In one determination method by the multilevel FSK detector 160, the hard decision calculator 161 performs the hard decision calculation (S202) to determine as to whether or not the number of symbols (the number of detections) estimated to be the reliable quaternary FSK is greater than a threshold ThA from the frequency deviation value of each symbol (S204). When the number of detections is equal to or greater than the threshold value ThA, the bit rate determiner 170 performs a determination for the quaternary FSK (S206). When the number of detections is less than the threshold ThA, and if a specified search period is exceeded (S207), the bit rate determiner 170 performs a determination for the binary FSK (S208).

In another determination method, the difference average calculator 162 obtains a difference between the routes of the frequency deviation between symbols and a specific pattern that is prepared in advance and calculates an average value of the differences (S203). Then, the difference average calculator 162 determines as to whether or not the difference average value is less than a threshold ThB (S205). When the difference average value is less than the threshold value ThB, the bit rate determiner 170 performs a determination for the quaternary FSK (S206). When the difference average value is equal to or greater than the threshold ThB, and if the specified search period is exceeded (S207), the bit rate determiner 170 performs a determination for the binary FSK (S208).

After the bit rate is determined in S107, S206, and S208, the bit rate determiner 170 notifies the decoder 103 of the rate information (bit rate information) (S300) and ends the processing.

<Multilevel FSK Determination Principle>

The multilevel FSK (multilevel symbol) determination principle using the hard decision calculator 161 and the difference average calculator 162 according to this embodiment will be described below.

Figure 15:
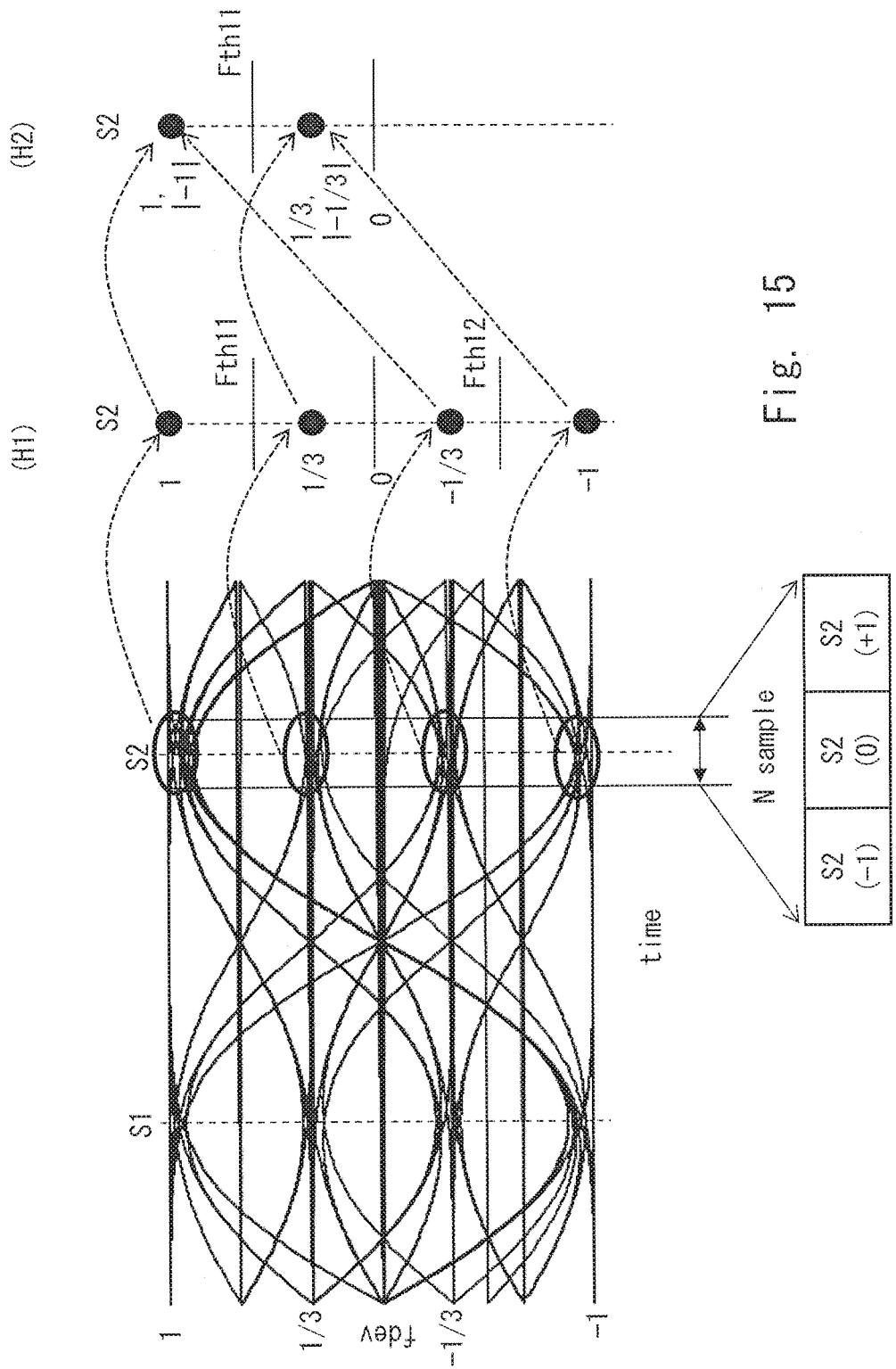
FIG. 15 is an explanatory diagram for describing a bit rate determination operation by hard decision according to the first embodiment.

FIG. 15 shows the determination principle of the quaternary FSK by the hard decision calculator 161. In the hard decision calculation, the hard decision is made on the frequency deviation (fdev) of the symbol based on thresholds. For example, the hard decision calculator 161 makes a hard decision by the method of determination H1 or determination H2.

The hard decision calculator 161 averages the frequency deviation values of several samples (the number of samples N) before and after the center of each symbol (the point defining the frequency deviation (fdev) of the symbol). Then, as shown in the determination H1, the hard decision calculator 161 compares the average value with the thresholds Fth11 and Fth12 to determine the reliable quaternary FSK (quaternary symbol).

Alternatively, the hard decision calculator 161 may average the frequency deviation values of several samples (the number of samples N) before and after the center of each symbol (the point defining the frequency deviation (fdev) of the symbol) and obtain an absolute value of this average value. Then, as shown in the determination H2, the hard decision calculator 161 may make a simple comparison between the absolute value of the average value and the threshold Fth11. In the determination H2, when the average value is less than the threshold Fth11, it is evaluated that the symbol is estimated to be the reliable quaternary FSK, and the number of this determination is counted.

Further, when the number of times (number of detections) that evaluated the symbol as being the quaternary FSK in a certain section (PHR section in the case of 802.15.4g) is equal to or greater than the threshold ThA, the hard decision calculator 161 determines the bit rate as being the quaternary FSK bit rate. This method can also be applied to a quaternary or higher order values in which the frequency deviation value of the symbol is vertically symmetrical.

Next, the determination principle of the multilevel FSK (multilevel symbol) by the difference average calculator 162 will be described below. In the calculation of the difference average, a difference average between the routes of the frequency deviation (fdev) between symbols and the route of the specific pattern is calculated. The specific pattern is a pattern showing a route of a frequency deviation between symbols of the reference multi-value FSK. The data of this specific pattern is stored. For example, the difference average calculator 162 or the FSK detector 160 includes a storage unit (register or the like) for storing the data of the specific pattern. The difference average calculator 162 calculates a difference average between the specific pattern of the stored data and the routes between the symbols of the received signal.

Figure 16:
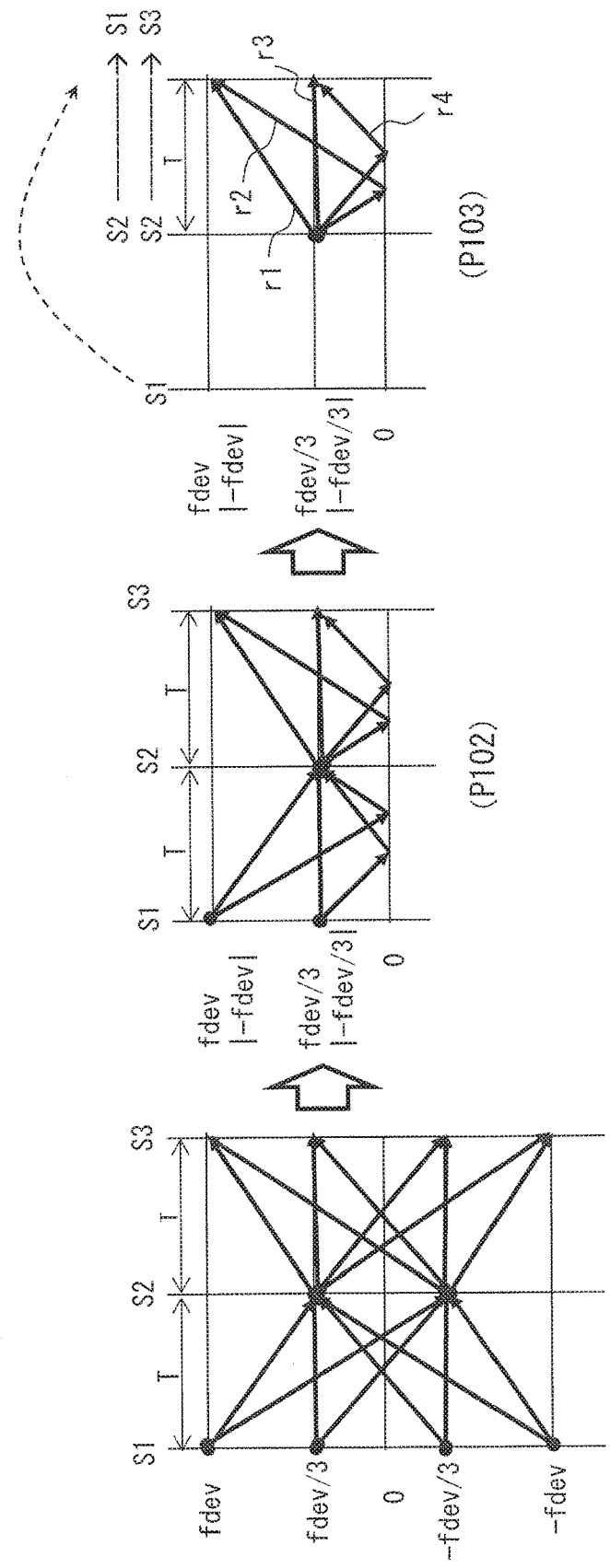
FIG. 16 is an explanatory diagram for describing a bit rate determination operation by difference average according to the first embodiment.

In this embodiment, the routes are optimized in order to reduce the amount of data of the specific pattern that is stored in advance. FIG. 16 shows a method of generating the specific pattern by the route optimization. For example, in the case of the quaternary FSK, the routes of the symbols before and after the reliable quaternary frequency deviation value (fdev/3 and −fdev/3) are used.

As in the pattern P101 of FIG. 16, the number of all the routes between before and after the symbol S2 (S1-S2-S3) is eight in the vicinity of fdev/3 of the symbol P2, and the number of the routes between before and after the symbol S2 is eight in the vicinity −fdev/3 of the symbol P2, which makes a total of 16 routes. When the absolute value of fdev is obtained from the pattern P101, the number of the routes will become half (eight) as shown in P102.

In the pattern P102, when the symbol before S2 (S2→S1) is folded backward (S2→S3), the number of the routes will be half (four), namely, routes r1 to r4. (P103) By using these four routes as the specific pattern to be used for the difference average, the routes can be simplified and the amount of data to be stored can be reduced. This method can also be applied to a quaternary or higher order values in which the frequency deviation values of the symbol are vertically symmetrical.

Figure 17:
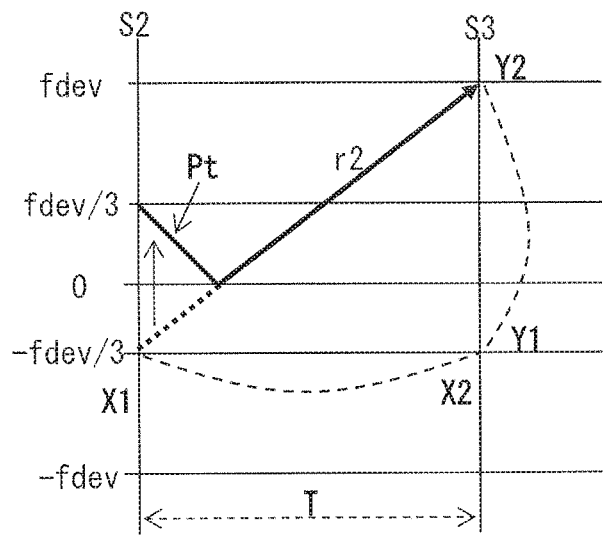
FIG. 17 is an explanatory diagram for describing the bit rate determination operation by difference average according to the first embodiment.

Equation (1) shows an equation for generating a specific pattern of a route r2 shown in FIG. 17. As shown in Equation (1), the pattern is generated by using a linear approximation equation, where the horizontal axis X indicates a time width between symbols, and the vertical axis Y indicates a frequency deviation value. The distance between X1 and X2 is the distance between symbols before and after −fdev/3, and the frequency deviation between Y1 and Y2 is −fdev/3 and fdev. Using these X, Y, and Equation (1), a frequency deviation value Y(t) for each sample is calculated, and an absolute value is obtained to generate a specific pattern Pt.

[Equation 1]

$$Y(t) = aX(t) + b, \quad a = \frac{Y2 - Y1}{X2 - X1}, \quad b = Y1 - aX1 \quad (1)$$
$$Pt(t) = |Y(t)|$$

Patterns can be generated for other routes in a manner similar to the above method. Table 1 shows a relationship between X, Y, and the specific pattern Pt for each of the routes r1 to r4 in FIG. 15.

TABLE 1

| Route | Y1 (Starting point) | Y2 (Ending point) | X(T) (Time) | Specific pattern |
|---|---|---|---|---|
| Route (r1) | fdev/3 | fdev | T | Pt1 |
| Route (r2) | −fdev/3 | fdev | T | Pt2 |
| Route (r3) | fdev/3 | fdev/3 | T | Pt3 |
| Route (r4) | −fdev/3 | fdev/3 | T | Pt4 |

The number of routes of the specific pattern differs according to the number of levels. An equation for calculating the number of routes is shown below. Equation (2) is an equation for calculating the number of all routes. As shown in Equation (2), the total number of routes can be calculated from the number of symbols (M−2) representing a multi-value number (M), reliable multivalued values and (2) indicating before and after the reference symbol. Equation (3) is an equation for calculating the minimum number of routes in this embodiment described in FIG. 16. Since the absolute value is obtained as in Equation (3), the number of reliable multilevel FSK symbols is reduced by half, and it can be calculated without the reference symbol.

[Equation 2]

$$\text{Total\_Path} = M \times (M - 2) \times 2 \quad (2)$$

[Equation 3]

$$\text{Min\_Path} = \frac{(M - 2)}{2} \times M \quad (3)$$

Table 2 shows a result of calculating the numbers of routes by Equations (2) and (3). In the case of octonary, the total number of routes is considerably greater than that in the case of quaternary. However, the minimum number of routes for octonary is greatly reduced.

TABLE 2

| M-value | Total number of routes | Minimum number of routes |
|---|---|---|
| 4 | 16 | 4 |
| 8 | 192 | 24 |
| 16 | 448 | 112 |

Next, a specific example of the difference average calculation performed by the difference average calculator 162 will be described. Since the route optimized as described above (the route folded back by half on the time axis) is used as the specific pattern, it is necessary to obtain the difference average by associating the data (the frequency deviation values) between symbols of the received signal with the specific pattern. In this example, as shown in FIG. 18, by storing the data of the symbols S1-S2-S3 in registers R1 and R2, the difference average from the specific pattern is obtained.

Figure 19:
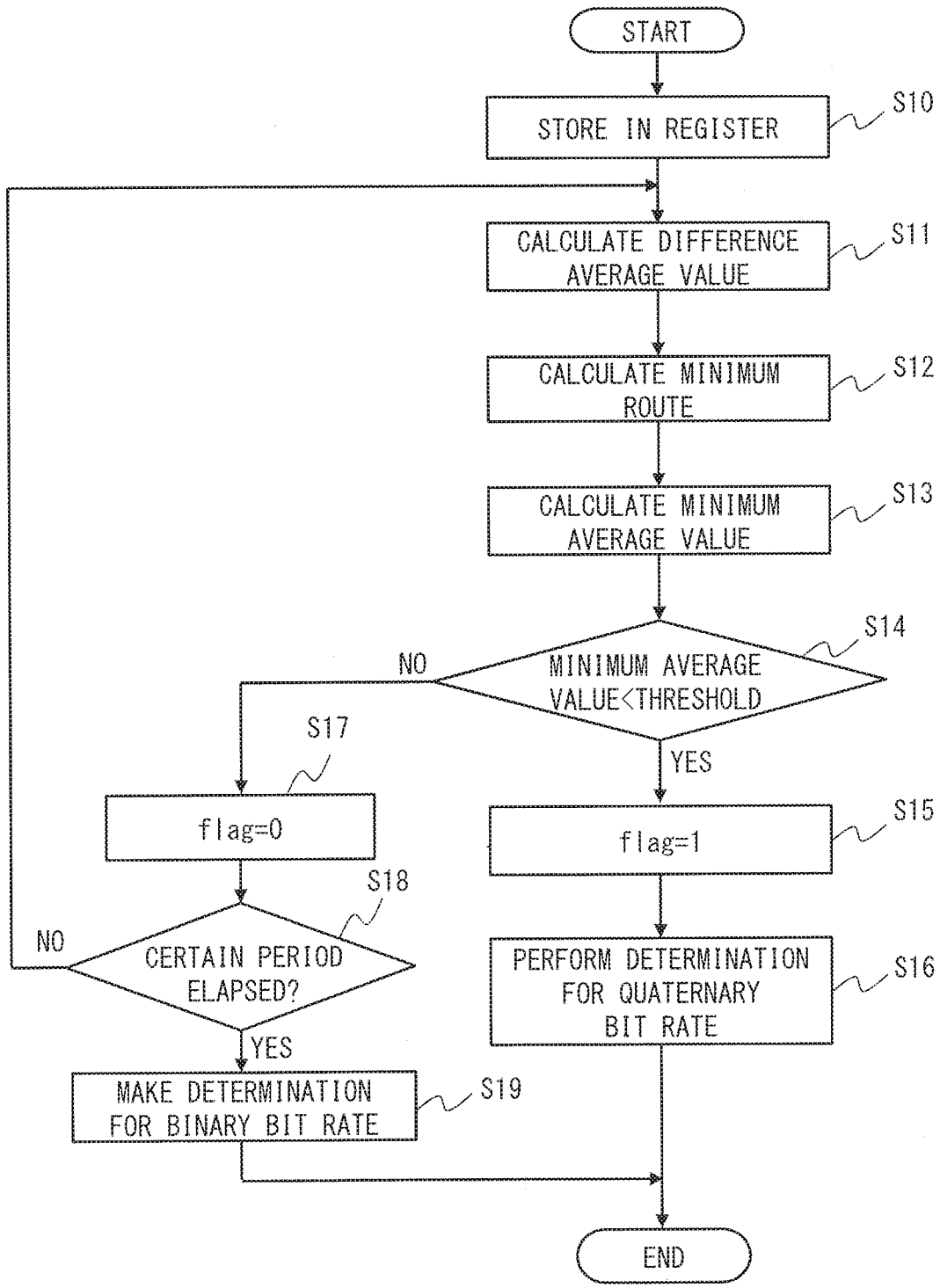
FIG. 19 is a flowchart showing an example of a difference average calculation method according to the first embodiment.

FIG. 19 and Equations (4.1) to (4.4) show the differential average calculation method and calculation equations, respectively, in the case of the quaternary FSK.

Figure 18:
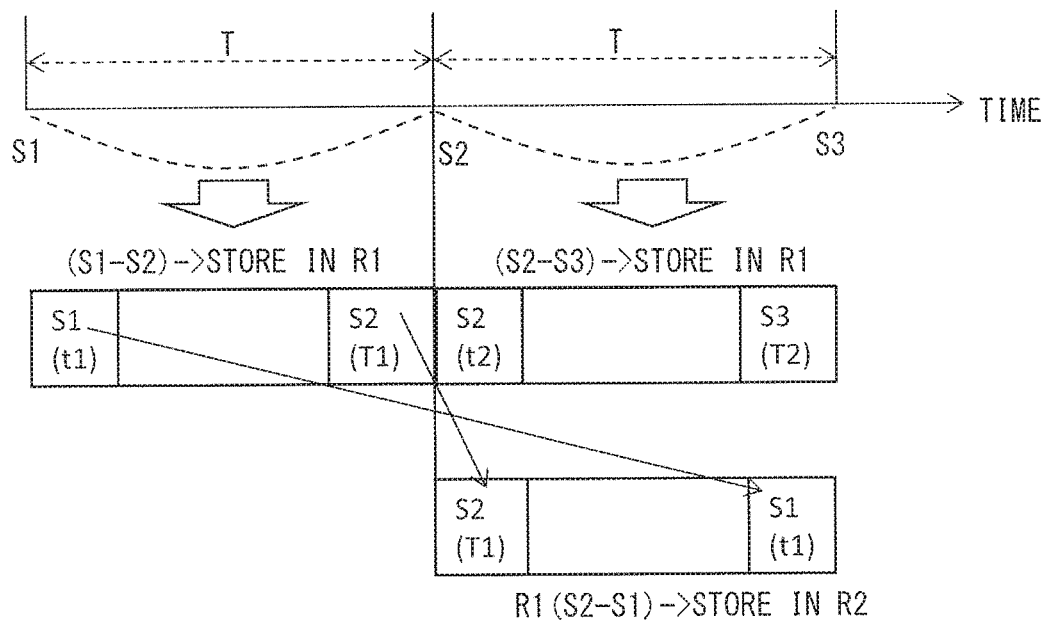
FIG. 18 is an explanatory diagram for describing the bit rate determination operation by difference average according to the first embodiment.

First, in Step S10, the difference average calculator 162 stores the samples from the symbol S1 to the symbol S2 in an array (register) R1 as shown in FIG. 18 in order to obtain a difference using the specific pattern Pt. When the storing of the samples is completed, it is necessary to fold back the samples up to the symbol S1 at the symbol S2. Thus, the order of the array R1 is reversed (in the order of S2 to S1)

and stored in the array (register) R2. Moreover, at the same time, the samples from the symbol S2 to the symbol S3 are stored in the array R1 (the data stored R1 is used for calculation of the next symbol).

Next, in Step S11, the difference average calculator 162 obtains a difference between the data in the array R2 and the data of the symbol S2 to the symbol S3 and the specific pattern Pt that has been prepared in advance by Equation (4.1) to calculate average values d1 and d2 of all the routes (four routes). In Equation (4.1), T is a time between the symbols, R2(t) is data in the array R2 (S2 to S1), R1(t) is data of the symbols S2 to S3, d1(i) is a difference average of a route I of the symbols S1 to S2, and d2(i) is a difference average of the route i of the symbols S2 to S3.

Next, in Step S12, by Equation (4.2), the difference average calculator 162 calculates the minimum routes (minimum difference average value) d1min and d2min having the smallest value from the difference average values d1 and d2 of all the routes calculated in S11. Next, in Step S13, by Equation (4.3), the difference average calculator 162 averages the difference values d1min and d2min of the minimum routes between the symbols S1 and S2 and the symbols S2 and S3, respectively, which have been calculated in S12 to obtain a difference average value dmin from the symbols S1 to S3.

Next, in Step S14, by Equation (4.4), the difference average calculator 162 compares the difference average value dmin with a threshold THval. When the difference average value dmin is smaller than the threshold THval, flag=1 is set (S15), and a determination for the quaternary FSK bit rate is performed (S16). When the difference average value dmin is equal to or greater than the threshold value THval, flag=0 is set (S17). Then, the processing from Step S11 is repeated on the next symbol. When flag=0 during a certain section (S18), a determination for the binary FSK bit rate is performed (S19).

[Equation 4]

$$\text{for } i = 1:4 \quad (4.1)$$

$$d1(i) = \frac{\sum_{t=1}^{T}(|R2(t)| - Pt(t))}{T}, \; d2(i) = \frac{\sum_{t=1}^{T}(|R1(t)| - Pt(t))}{T}$$

$$\text{end}$$

$$d1_{min} = \min(d1), \; d2_{min} = \min(d2) \quad (4.2)$$

$$d_{min} = \left(\frac{d1_{min} + d2_{min}}{2}\right) \quad (4.3)$$

$$\text{if } (d_{min} < THval), \text{ flag} = 1, \quad (4.4)$$

$$\text{else flag} = 0,$$

$$\text{end}$$

Figure 20:
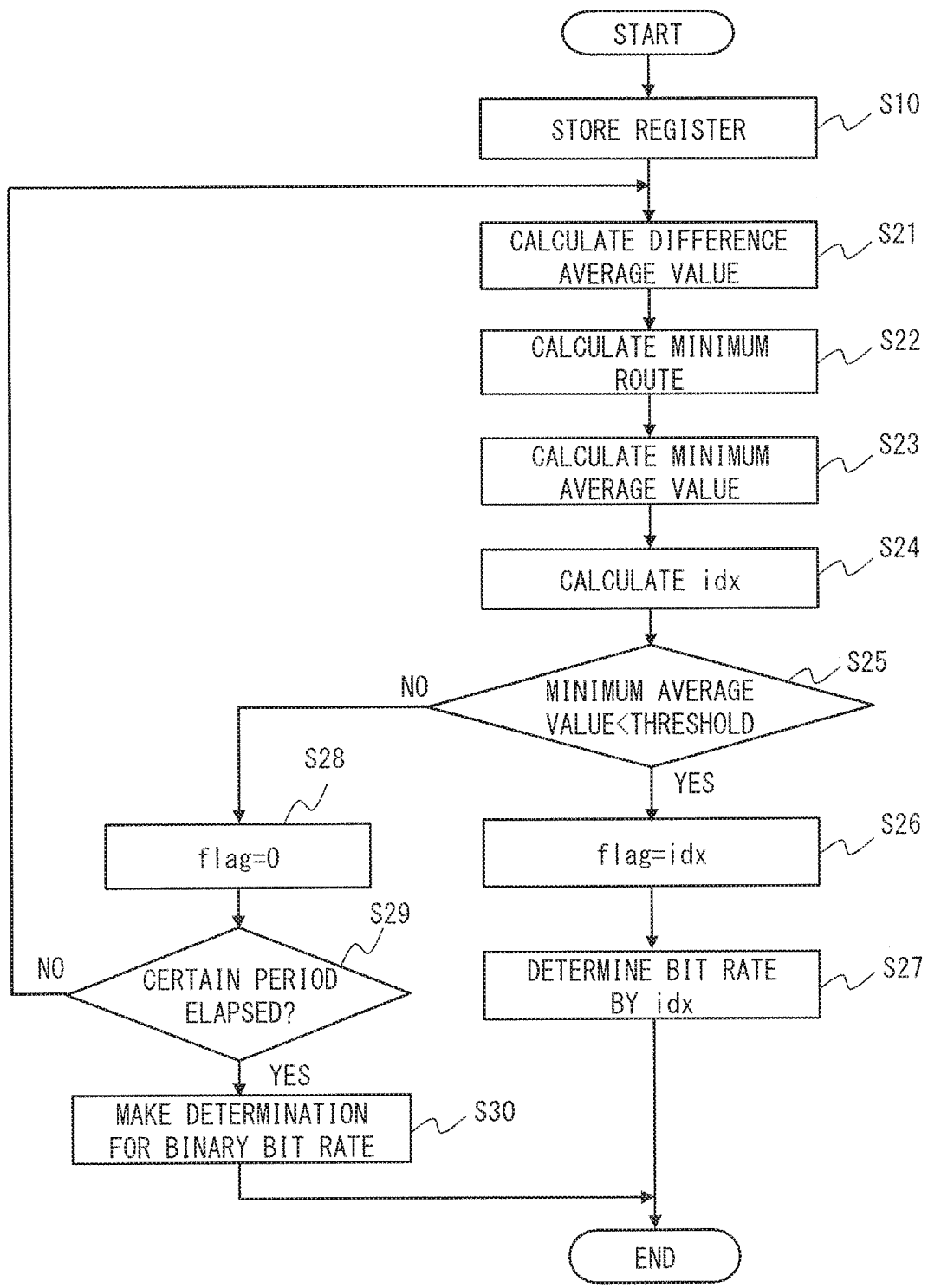
FIG. 20 is a flowchart showing another example of the difference average calculation method according to the first embodiment.

The calculation by the difference average calculator 162 can also be applied to quaternary or higher order values, in which the frequency deviation values of the symbol are vertically symmetrical. FIG. 20 and Equations (5.1) to (5.5) show a general average calculation method and calculation equations of the difference average, respectively, in the case of the multilevel FSK. The basic calculation method is the same as that in FIG. 19 and Equations (4.1) to (4.4). However, for example, for the octonary FSK, the specific patterns for quaternary and octonary need to be obtained, and the difference average values for quaternary and octonary need to be calculated.

Like in FIG. 19, after the Step S10, in Step S21, the difference average calculator 162 obtains, by Equation (5.1), differences between the data in the array R2 and the data from the symbols S2 to S3 and specific patterns Pt(j) for the respective values that have been prepared in advance and calculates average values d1(j) and d2(j) for routes of the respective values. In this example, (006A) is an index (idx) corresponding to the M value (for example, quaternary and octonary) of FSK. At the same time, samples from the symbols S2 to S3 are stored in the array R1.

Next, in Step S22, by Equation (5.2), the difference average calculator 162 calculates the minimum routes d1(j)min and d2(j)min from the difference average values d1(j) and d2(j) of all the routes for the respective values calculated in S21. Next, in Step S23, by Equation (5.3), the difference average calculator 162 averages, for the respective values, the difference values d1min and d2min of the minimum routes for the respective values, respectively, which have been calculated in S22 to obtain a difference average values d(j)ave for the respective values from the symbols S1 to S3. Next, in Step S24, by Equation (5.4), the difference average calculator 162 calculates the minimum difference average value dmin among the difference average values d(j)ave for the respective values obtained in S23 and calculates idx indicating the respective values.

Next, in Step S25, by Equation (5.5), the difference average calculator 162 compares the difference average value dmin with a threshold THval. When the difference average value dmin is smaller than the threshold THval, flag=idx is set (S26), and the bit rate is determined based on idx (S27). When idx=1, the bit rate is determined to be a rate in the quaternary FSK, while when idx=2, the bit rate is determined to be a rate in the octonary FSK.

When the difference average value dmin is equal to or greater than the threshold value THval, flag=0 is set (S28). Then, the processing from Step S21 is repeated on the next symbol. When flag=0 during a certain section (S29), a determination for the binary FSK is performed (S30).

[Equation 5]

$$\text{if } (M \; FSK), \; j = 0, 1, 2, \ldots \; ; M = 2^{(j+1)}$$

$$\text{if } (j = 1), TotalPath = 4; \text{ if } (j = 2), TotalPath = 24;$$

$$\text{for } i = 1:TotalPath$$

$$d1(j, i) = \frac{\sum_{t=1}^{T}(|R2(t)| - Pt(j, t))}{T}, \quad (5.1)$$

$$d2(j, i) = \frac{\sum_{t=1}^{T}(|R1(t)| - Pt(j, t))}{T}$$

$$\text{end}$$

$$d1(j)_{min} = \min(d1(j)), \; d2(j)_{min} = \min(d2(j)) \quad (5.2)$$

$$d(j)_{ave} = \left(\frac{d1(j)_{min} + d2(j)_{min}}{2}\right) \quad (5.3)$$

$$[idx, d_{min}] = \min2(d(j)_{ave}) \; \text{idx} = \text{Selected } j \quad (5.4)$$

$$\text{if } (d_{min} < THval), \text{ flag} = idx, \quad (5.5)$$

$$\text{else flag} = 0,$$

$$\text{end}$$

Effect of First Embodiment

As described above, in this embodiment, in the communication system using the FSK modulation scheme that does not attach the bit rate information to the transmission frame, the bit rate (symbol rate) is determined based on the symbol period of the preamble portion using a known pattern. As a method of detecting the symbol period of the preamble portion, a method of detecting a zero-crossing point in the period or a method of calculating a cross-correlation value to detect intervals of the periods. Then, the bit rate is determined from the detected symbol periods. Accordingly, it is possible to detect the bit rate (symbol rate) only with the preamble portion.

Further, in this embodiment, in order to detect the symbol period, the zero-crossing point detection and the cross-correlation detection are selectively used by using the received signal strength (RSSI). When the RSSI is less than a certain threshold value (a condition that reception sensitivity is poor), the cross-correlation detection is performed to thereby increase the detection accuracy. While when the RSSI exceeds the threshold value (a condition that the reception sensitivity is good), the zero-crossing point detection is performed to determine the rate, so that the amount of calculation is reduced. Thus, the bit rate (symbol rate) can be detected by the optimum method.

Furthermore, in this embodiment, in the multiple bit rate communication system that uses the multilevel FSK having the same symbol rate (M-ary FSK, M>=4), the bit rate cannot be determined by the preamble portion. For this reason, the determination is performed at a position where a reliable M-ary symbol is present. Thus, the bit rate in the multilevel FSK can be determined.

In this embodiment, the hard decision method and the difference average determination method are employed as the method for determining the bit rate. When the number of symbols evaluated to be a reliable M-ary FSK from the frequency deviation values of the symbols is equal to or greater than the threshold ThA, the hard decision method is used. While when differences between the routes of the frequency deviations between the symbols and the specific pattern prepared in advance is obtained and the average value of the differences is less than the threshold ThB, the difference average determination method that makes a determination of an M-ary FSK bit rate is used. Thus, the bit rate in the multilevel FSK can be reliably determined.

Furthermore, in this embodiment, in the determination of the bit rate, the hard decision method and the difference average determination method are selectively used according to the RSSI. When the RSSI is less than a certain threshold (a condition that reception sensitivity is poor), the difference average determination method is used to thereby increase the determination accuracy. While when the RSSI exceeds the threshold value (a condition that the reception sensitivity is good), the hard decision method is selected to determine the rate, so that the amount of calculation is reduced. Thus, the bit rate in the multilevel FSK can be determined by the optimum method.

In particular, in the above configuration, the bit rate of the binary FSK is determined by the symbol rate detector 140 of FIG. 13 and the bit rate of the quaternary FSK or higher order FSK is determined by the multilevel FSK detector 160. Thus, the rate can be determined during data communication. In this way, as control on the switching of the data rates can be omitted, the communication efficiency can be improved. Further, since the optimum function can be selected using RSSI, the bit rate can be effectively determined. Furthermore, the system can be easily expanded because the above configuration can be simply applied to the bit rates of quaternary or higher order values.

As described above, in this embodiment, the bit rate is determined by using a received frame. By doing so, communication necessary for changing the bit rate can be omitted, and thus the communication efficiency can be improved. There is another effect of reducing the amount of power consumption used in the communication for changing the bit rate. This effect is more apparent in a smart meter system that requires a long-term operation by a battery-driven operation.

Figure 21:
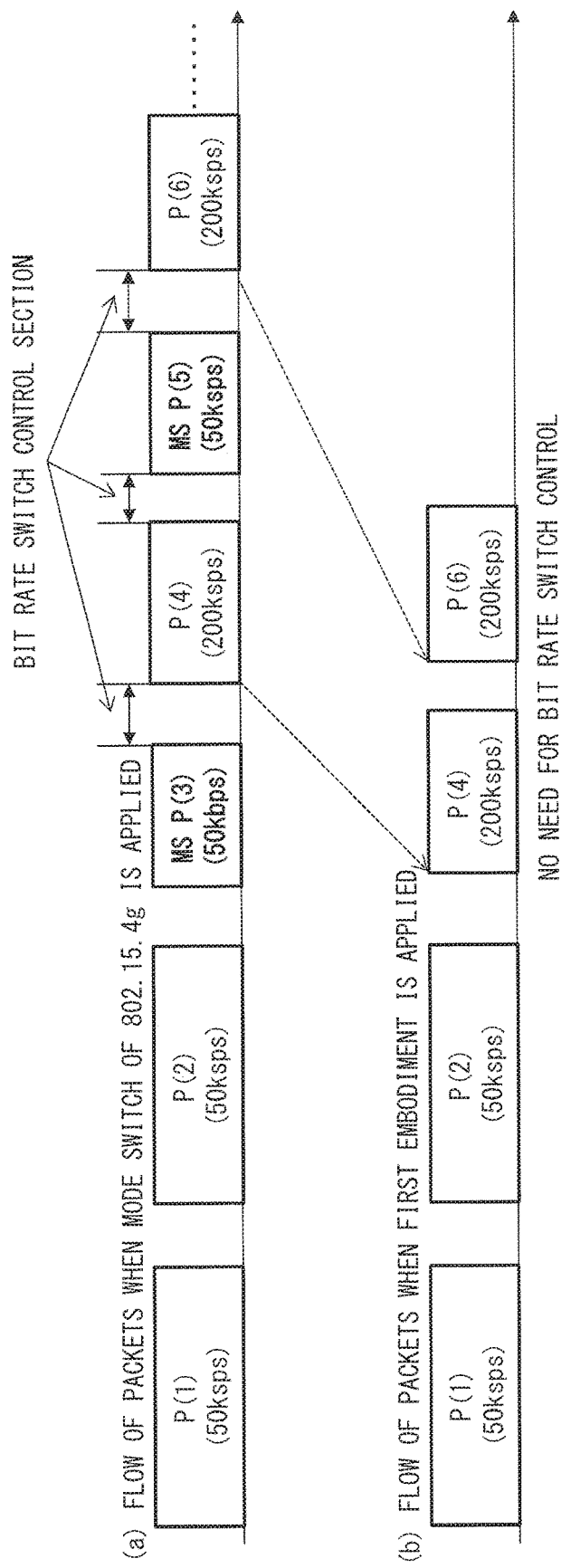
FIG. 21 is a diagram showing a flow of packets for describing an effect of the first embodiment.

As shown in FIG. 21A, in the case of the FSK standard in 802.15.4g, in order to change a bit rate, the transmitter attaches the bit rate information on the next packet to a Mode Switch (MS) packet P(3) during data communication and transmits the MS packet P(3). A receiver decodes the data and makes an optimum setting necessary for receiving the next packet. This operation is performed per packet. Thus, when a series of processing for transmitting the packet P(4) with the changed bit rate is ended, the bit rate returns to the bit rate before it is switched. If the bit rate is changed again, a change of the bit rate needs to be conveyed by a packet P(5) in a manner similar to the above case, and then the data communication by a packet P(6) is performed.

On the other hand, in this embodiment, as shown in FIG. 21B, Mode switch packets P(3) and P(5) are omitted, and communication by packets P(4) and P(6) is performed after a packet P(2). Thus, the communication efficiency is increased. Moreover, since the transmission/reception processing by the Mode Switch packets P(3) and P(5) is omitted, the operating power can be reduced. If preamble lengths of the packets P(3) and P(5) are long, the power reduction effect further increases. Furthermore, as control on the switching of the bit rates can be omitted, the overhead on the control can be eliminated.

Figure 22:
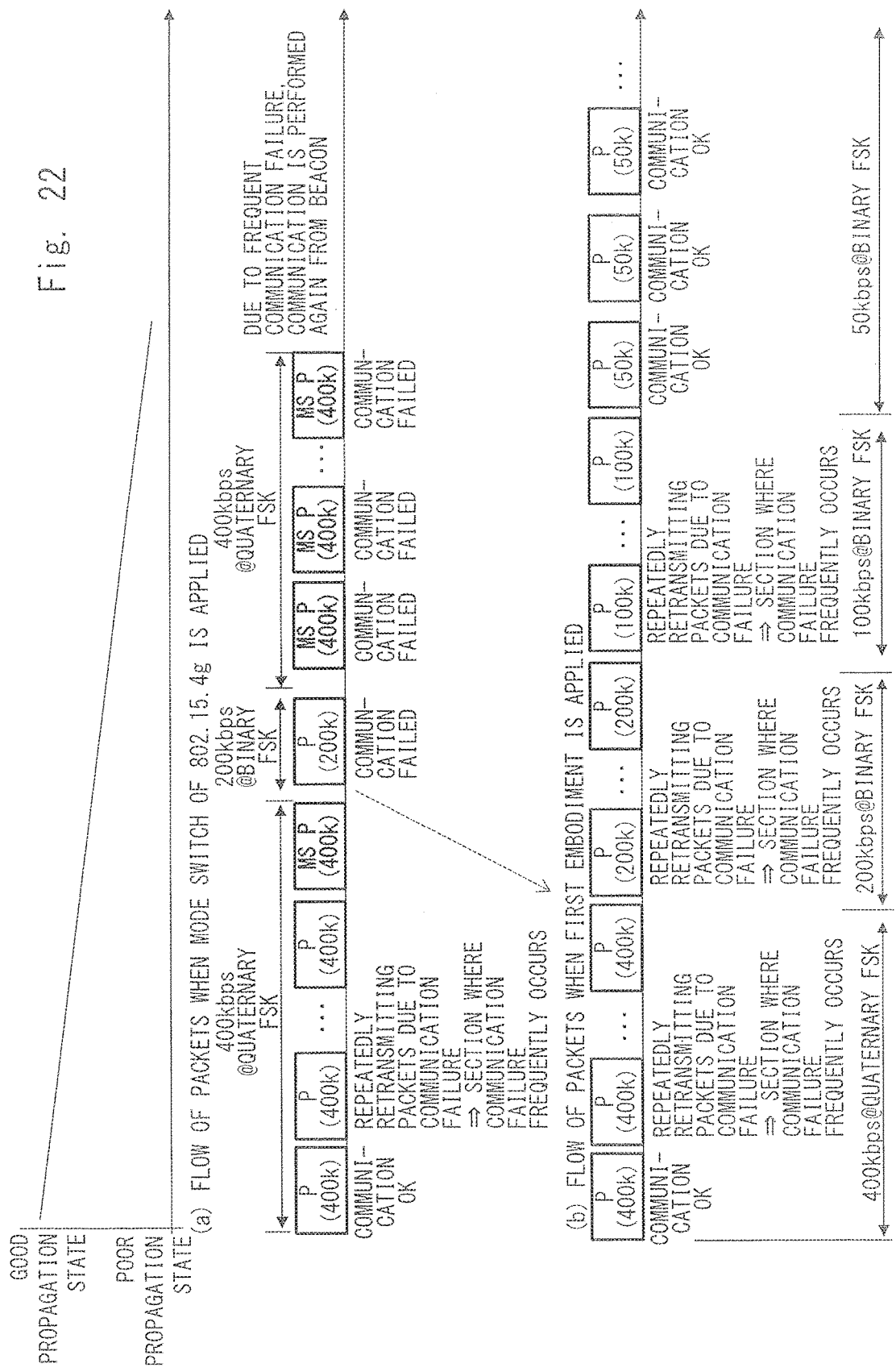
FIG. 22 is a diagram showing a flow of packets for describing an effect of the first embodiment.

Additionally, in an environment where a propagation state may change, when the propagation state gets worse, the bit rate can be gradually lowered by the transmitter. This is a commonly used method in WiFi communication. Here, a case where the above method is applied to FSK in 802.15.4g shall be considered. A network using a maximum bit rate (400 kbps) as a basic rate as shown in FIG. 22A shall be assumed. In an environment where the propagation state is poor, Mode Switch (MS) packet cannot be transmitted at the maximum bit rate, and a reduction of the bit rate cannot be conveyed to a communication partner. Therefore, under the above-mentioned environment, communication cannot be performed, and the network needs to be reconstructed. On the other hand, in this embodiment, as shown in FIG. 22B, the bit rate can be switched at the time of retrying and communication can be performed at the optimum bit rate suitable for the environment.

Second Embodiment

Figure 23:
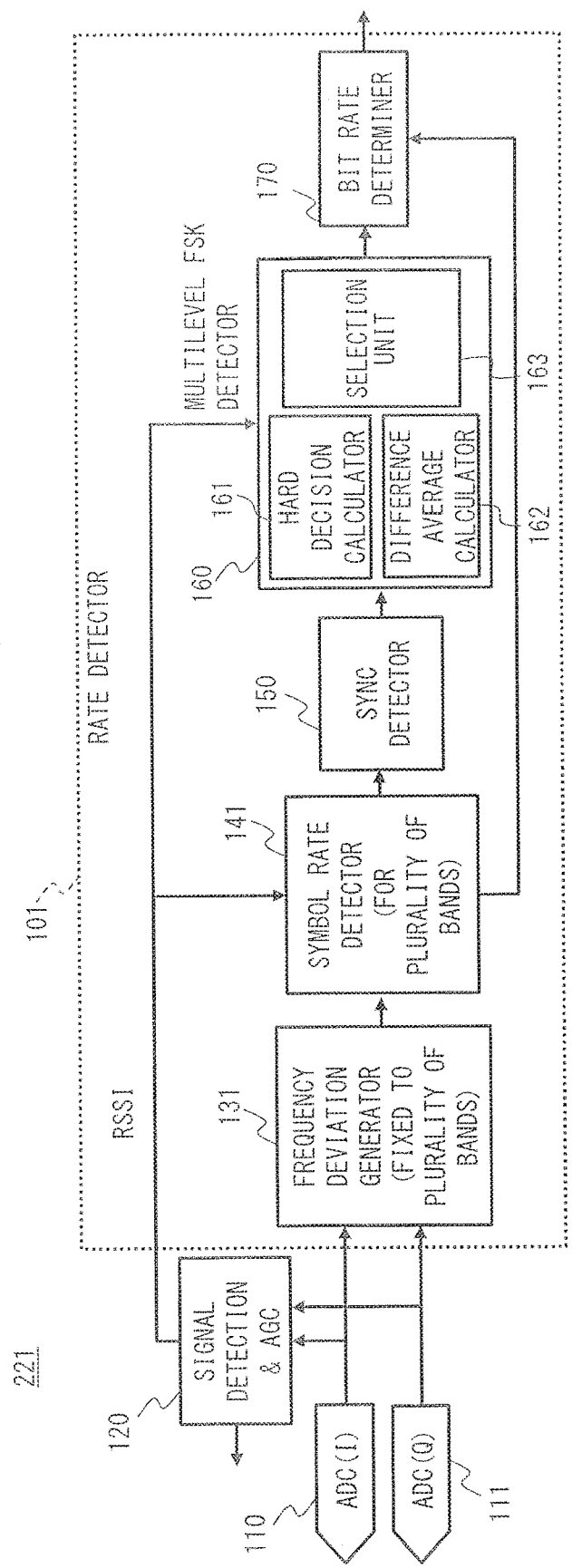
FIG. 23 is a configuration diagram showing a configuration example of a rate detector according to a second embodiment.

Hereinafter, a second embodiment will be described with reference to the drawings FIG. 23 shows a configuration example of the rate detector according to this embodiment. The configuration of FIG. 23 is an improved configuration of the configuration of the first embodiment shown in FIG. 13.

As shown in FIG. 23, the rate detector according to this embodiment differs from the configuration of FIG. 13 of the first embodiment only in a frequency deviation generator 131 and a symbol rate detector 141. Other configurations are the same as those in the first embodiment. In the first embodiment, the frequency deviation generator 131 is fixed to one band. However, in this embodiment, the frequency deviation generator 131 is fixed to a plurality of bands. For example, the frequency deviation generator 131 is composed of a plurality of filters.

The frequency deviation generator 131 provides an optimum filter for each symbol rate that can be received at the corresponding carrier frequency in order to reduce the influence of out-of-band noise when a low symbol rate is received. For example, when the data rates described with reference to FIG. 9 can be received, a filter optimum for the frequency of each symbol rate is provided (filters for the symbol rate RA, for RB, and for RC). Then, the filtering is performed, and the frequency deviation value is generated for each sample, so that the symbol periods appears.

Further, the symbol rate detector 141 detects the symbol rates corresponding to a plurality of bands (filters) of the frequency deviation generator 131. The symbol rate detector 141 is composed of, for example, a plurality of detectors. Like in the first embodiment, (the plurality of) symbol rate detectors 141 detect the symbol period by the zero-crossing point detection or the cross-correlation detection in the preamble portion from the outputs of the respective filters and determine the symbol rates from the detected symbol periods.

The band-fixed frequency deviation generator 130 of FIG. 13 of the first embodiment sets a cutoff frequency that can cover the maximum symbol rate in the reception filter so that a plurality of symbol rates can be detected. Therefore, if the minimum symbol rate is received, the wider the cutoff frequency, the more the influence of the noise outside the band. This causes the degradation of the determination accuracy in the vicinity of the reception sensitivity. On the other hand, in this embodiment, since an optimum filter is provided for each symbol rate that can be received at the corresponding carrier frequency as shown by the fixed band frequency deviation generator 131 of FIG. 23, the data rate determination accuracy can be further improved.

Third Embodiment

Hereinafter, a third embodiment will be described with reference to the drawings. FIG. 24 shows a configuration example of the rate detector according to this embodiment.

The configuration of FIG. 24 is an improved configuration of the configuration of the first embodiment shown in FIG. 13. In this embodiment, the band of the filter of the RF-AFE unit 210 is made variable (analog variable filter), and the band of the frequency deviation generator of the rate detector is also made variable (digital variable filter).

As shown in FIG. 24, the RF-AFE unit (analog unit) 210 includes an LNA (low noise amplifier) 181, a mixer 182, a variable filter 183, and amplifiers 184 and 185.

The LNA 181 amplifies a received signal (RF signal) with low noise. The mixer 182 down-converts the amplified signal. The variable filter 183 performs filter processing on the down-converted signal in the set band. The amplifiers 184 and 185 amplify the filtered I and Q signals.

For example, when the data rates described with reference to FIG. 9 can be received, the variable filter 183 of the analog unit and the variable filter of the band variable frequency deviation generator 132 are initialized with a cutoff frequency of 200 ksps so that the maximum symbol rate can be covered. Then, the frequency deviation value is generated for each sample.

The symbol rate detector 142 inputs the frequency deviation value for each sample and, as in the first embodiment, obtains the correlation value in accordance with the symbol rate of 200 ksps by the zero-crossing point detection or the cross-correlation detection in the preamble portion to detect the symbol rate. If the symbol rate detector 142 cannot detect 200 ksps, it notifies the frequency deviation generator 132 to switch the variable filter to a cutoff frequency of 100 ksps by using a control signal fset1.

When the frequency deviation generator (band variable) 132 receives a switching notice from the symbol rate detector 142, it switches the band of the filter to 100 ksps. After that, the symbol rate detector 142 detects a symbol period of 100 ksps by the zero-crossing point detection or the correlation detection. The symbol rate detector 142 repeats to detect the symbol period of 100 ksps until the expected symbol rate can be detected or until a minimum switchable symbol rate (50 ksps) is reached.

If the expected symbol is 50 ksps, and this symbol rate can be detected, the symbol rate detector 142 notifies the variable filter 183 to switch to the cutoff frequency of 50 ksps by using a control signal fset2. When the variable filter 183 receives the switching notice, it switches the band of the filter to 50 ksps. The changing of the cutoff frequency of the reception filter for the purpose of detecting the symbol rate is performed within the preamble portion.

If the expected symbol is 200 ksps, and this symbol rate can be detected, in order to make the evaluation of whether the bit rate is binary bit rate (200 kbps) or quaternary bit rate (400 kbps), after the synchronization is detected by the Sync detector 150, the multilevel FSK detector 160 performs detection at the position where the reliable quaternary FSK is present. The detection method by the multilevel FSK detector 160 is the same as that in the first embodiment.

After the bit rate is determined, the bit rate determiner 171 can switch the variable filter of the frequency deviation generator 132 to the optimum filter corresponding to the determined bit rate by using a control signal fset3.

Figure 25A:
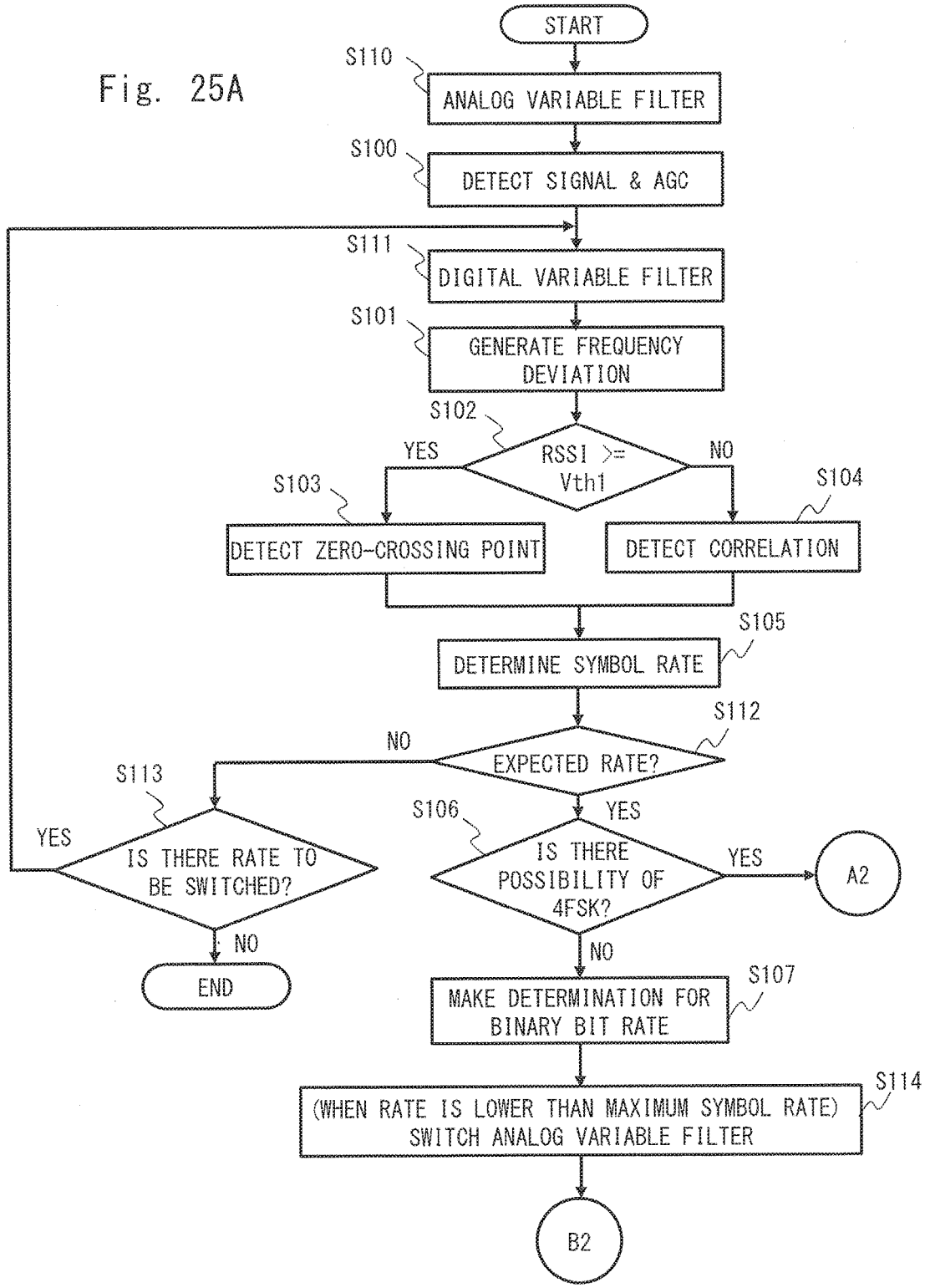
FIG. 25A is a flowchart showing an operation example of the rate detector according to the third embodiment.
Figure 25B:
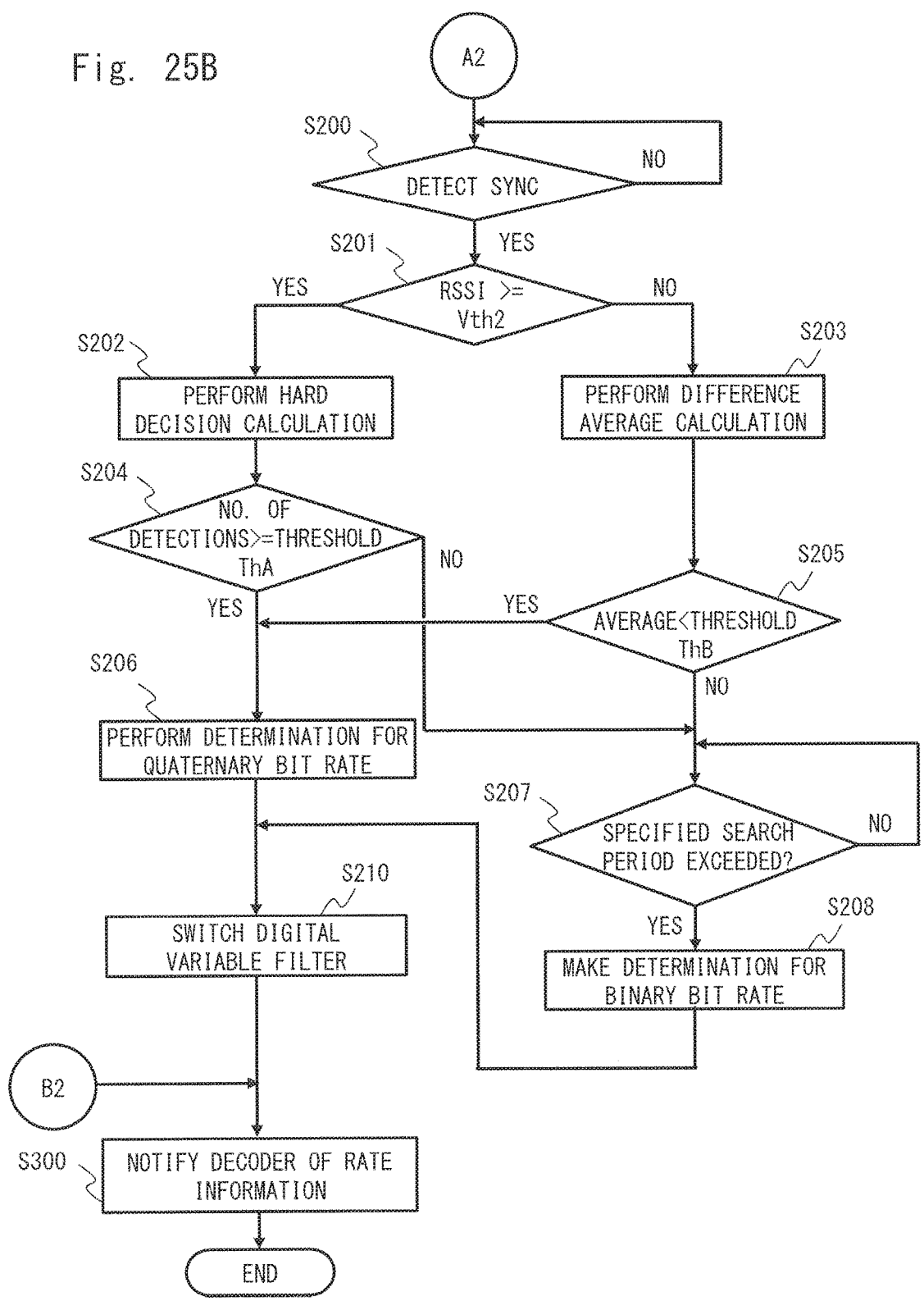
FIG. 25B is a flowchart showing an operation example of the rate detector according to the third embodiment.

The flowcharts of FIGS. 25A and 25B show an operation of the configuration according to this embodiment shown in FIG. 24.

Firstly, the reception filters (the variable filter 183 in the analog unit in Step S110 and the variable filter in the frequency deviation generator 132 in the digital unit in Step S111) initialize the cutoff frequency so that the maximum symbol rate (200 ksps) can be covered.

After the filter processing (S110) of the variable filter 183 of the analog unit, the received signal is input to the digital unit, and the signal detection & AGC 120 performs signal detection and AGC processing to optimize the amplitude of the received signal and to calculate the RSSI value (S100). After the AGC processing, the frequency deviation generator 132 filters the digital received signal (S111) and generates the frequency deviation value for each sample (S101).

Next, the symbol rate detector 142 selects the symbol rate detection method using the RSSI value (S102). If the RSSI value is equal to or greater than the threshold (Vth1), the symbol rate detector 142 detects the cycle of the zero-crossing points (S103). If the RSSI value is less than the threshold (Vth1), the symbol rate detector 142 detects the cycle of the correlation peak value by the correlation detection (S104). Then, the symbol rate is determined (S105).

Next, the symbol rate detector 142 evaluates as to whether or not the determined symbol rate is the expected rate (initial setting rate: 200 ksps) (S112). If the symbol rate is not the expected rate, the symbol rate detector 142 checks as to whether or not there is a rate to be switched next (symbol rate lower than the initial setting rate by one level: 100 ksps) (S113). If there is a rate to be switched next, the symbol rate detector 142 switches the digital variable filter (frequency deviation generator 132) to the filter for 100 ksps (S111) and repeats the processing from Step S101 to Step S112.

In the determination of the expected rate (100 ksps) in Step S112, if the symbol rate is not the expected rate, the symbol rate detector 142 then checks for a rate to be switched next (symbol rate lower than the expected rate by one level: 50 ksps) (S113). If there is the rate to be switched next, the digital variable filter (frequency deviation generator 132) is switched to the filter for 50 ksps (S111). Then, the processing from Step S101 to Step S112 is repeated. If it is evaluated that there is no rate to be switched next in Step S109, the rate determination processing is ended.

For example, if the reception symbol rate is 50 ksps, when 50 ksps is detected in Step S112, the symbol rate detector 142 determines that there is no possibility of the quaternary FSK (S106) and makes a determination for the binary bit rate (S107). After that, the analog variable filter 183 is switched to 50 ksps (S114). Furthermore, the bit rate determiner 170 notifies the decoder 103 of the rate information (bit rate) (S300) and ends the processing.

Since the initial setting of the analog variable filter is adjusted to the maximum symbol rate, the switching is performed when the symbol rate is determined to be smaller than the maximum symbol rate.

For example, when the reception symbol rate is 200 ksps, if 200 ksps is detected in Step S112, the symbol rate detector 142 determines that there is a possibility of 4FSK (S106). After the Sync detector 150 detects Sync (S200), the process proceeds to the quaternary bit rate determination processing.

After Sync is detected, the multilevel FSK detector 160 selects the rate determination method using the RSSI value (S201). When the RSSI value is equal to or greater than the threshold value (Vth2), the multilevel FSK detector 160 detects a reliable quaternary FSK symbol by the hard decision calculation method (S202), compares the number of detections with a threshold A (S204). If the number of detections is equal to or greater than the threshold A, it is determined to be a bit rate (400 kbps) of the quaternary FSK (S206), and then the digital variable filter is switched to an optimum filter according to the reliable data rate (400 kbps) (S210).

If the RSSI value is less than the threshold value (Vth2), the multilevel FSK detector 160 obtains a difference between the routes of the frequency deviations between the symbols and the prepared specific pattern by the difference average calculation method, and calculates the average value (S203). Then, the average value is compared with a threshold B (S205). When the average value is less than the threshold B, it is determined to be a bit rate (400 kbps) of the quaternary FSK (S206), and then the digital variable filter is switched to an optimum filter according to the reliable data rate (400 kbps) (S210).

If it is determined as NO in Step S204 or Step S205, a determination is made as to whether or not a specified detection section for detecting the symbols of the quaternary FSK (S207). While if it is determined as YES in Step S205, the bit rate is determined as the binary FSK rate (200 kbps) (S208). After that, the digital variable filter is switched to an optimum filter according to the reliable data rate (200 kbps) (S210). Furthermore, the bit rate determiner 170 notifies the decoder 103 of the rate information (bit rate) (S300) and ends the processing.

As described above, in this embodiment, the cutoff frequency of the variable filter of the band variable frequency deviation generator 132 is switched gradually from the setting for the maximum receivable symbol rate to lower rates. Thus, there is an advantage that the time taken for detecting the symbol rate can be reduced. Further, as one variable filter can be switched according to a plurality of bands, an optimum reception filter can be achieved without increasing the circuit size, and the influence of out-of-band noise can be reduced. Accordingly, further improvement in the determination accuracy can be expected in the vicinity of reception sensitivity.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the invention made by the present inventor has been described in detail based on the embodiments, it is obvious that the present disclosure is not limited to the above embodiments, and various modifications can be made without departing from the scope of the invention.

The whole or part of the exemplary embodiments disclosed above can be described as, but not limited to, the following supplementary notes.

(Supplementary Note 1)

A reception apparatus comprising:

an RF signal processing unit configured to receive an RF signal modulated by an FSK modulation scheme and process the received RF signal;

a baseband signal processing unit configured to decode the processed received signal into packets; and an MAC processing unit configured to execute a process according to the packets, wherein the baseband signal processing unit comprises:

a frequency deviation generation unit configured to generate a frequency deviation in the received signal;

a symbol rate detection unit configured to detect a symbol rate based on a period of a preamble portion in a transmission frame included in the received signal;

a multilevel symbol detection unit configured to detect a multilevel-modulated multilevel symbol based on a frequency deviation in the transmission frame;

a bit rate determination unit configured to determine a bit rate based on the detected symbol rate and the detected multilevel symbol; and a decoding unit configured to decode the transmission frame according to the determined bit rate.

(Supplementary Note 2)

The reception apparatus according to Supplementary note 1, wherein the frequency deviation generation unit comprises a filter that performs a filtering process at a fixed band, and a cutoff frequency of the filter is greater than a maximum symbol rate of the received signal.

(Supplementary Note 3)

The reception apparatus according to Supplementary note 1, wherein the frequency deviation generation unit comprises a plurality of filters each performs a filtering process at a plurality of fixed bands, respectively, and cutoff frequencies of the plurality of filters correspond to a plurality of symbol rates of the received signal, respectively.

(Supplementary Note 4)

The reception apparatus according to Supplementary note 1, wherein the RF signal processing unit comprises an analog variable filter with a variable band, the frequency deviation generation unit comprises a digital variable filter with a variable band, and the bands of the analog variable filter and the digital variable filter are initialized to a frequency greater than a maximum symbol rate of the received signal and are switched to a lower frequency according to a result of the detected symbol rate or the detected bit rate.

(Supplementary Note 5)

The reception apparatus according to Supplementary note 4, wherein the band of the analog variable filter is switched according to the detected symbol rate.

(Supplementary Note 6)

The reception apparatus according to Supplementary note 4, wherein the band of the digital variable filter is switched according to the detected bit rate.

(Supplementary Note 7)

A wireless communication system comprising a plurality of wireless communication apparatuses constituting a network, wherein the plurality of wireless communication apparatuses each comprise the reception apparatus according to Supplementary note 1.

(Supplementary Note 8)

A wireless communication system comprising a plurality of wireless communication apparatuses constituting a plurality of networks, wherein some of the plurality of wireless communication apparatuses constituting one network among the plurality of networks each comprise the reception apparatus according to Supplementary note 1.

(Supplementary Note 9)

The wireless communication system according to Supplementary note 7 or 8, wherein each of the plurality of wireless communication apparatuses specifies a bit rate per packet to be transmitted and modulates the transmission frame by an FSK modulation scheme corresponding to the specified bit rate.

(Supplementary Note 10)

The wireless communication system according to Supplementary note 7 or 8, wherein the plurality of wireless communication apparatuses conform to an FSK modulation scheme in IEEE 802.15.4g.

(Supplementary Note 11)

The wireless communication system according to Supplementary note 7 or 8, wherein the plurality of wireless communication apparatuses are smart meters.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A rate determination apparatus comprising:
a memory for storing instructions; and
a processor configured to execute the stored instructions to implement:
    a receiver configured to receive a transmission frame modulated by a Frequency Shift Keying (FSK) modulation scheme;
    a symbol rate detector configured to detect a symbol rate based on a period of a preamble portion in the received transmission frame;
    a multilevel symbol detector configured to detect a multilevel-modulated multilevel symbol based on a frequency deviation in the received transmission frame; and
    a bit rate determiner configured to determine a bit rate based on the detected symbol rate and the detected multilevel symbol, wherein
the multilevel symbol detector detects the multilevel symbol based on a difference between a specific frequency deviation pattern corresponding to the multilevel symbol to be detected and a reception frequency deviation in the transmission frame,
the multilevel symbol detector detects the multilevel symbol based on an average of the difference between the specific frequency deviation pattern and the reception frequency deviation,
the specific frequency deviation pattern includes a plurality of frequency deviation routes corresponding to combinations of frequencies between symbols, and
the multilevel symbol detector detects the multilevel symbol based on a frequency deviation route having a smallest average of the difference from the reception frequency deviation among the plurality of frequency deviation routes.

2. A rate determination apparatus comprising:
a memory for storing instructions; and
a processor configured to execute the stored instructions to implement:
    a receiver configured to receive a transmission frame modulated by a Frequency Shift Keying (FSK) modulation scheme;
    a symbol rate detector configured to detect a symbol rate based on a period of a preamble portion in the received transmission frame;
    a multilevel symbol detector configured to detect a multilevel-modulated multilevel symbol based on a frequency deviation in the received transmission frame; and
    a bit rate determiner configured to determine a bit rate based on the detected symbol rate and the detected multilevel symbol, wherein
the multilevel symbol detector detects the multilevel symbol based on a difference between a specific frequency deviation pattern corresponding to the multilevel symbol to be detected and a reception frequency deviation in the transmission frame or a result of a hard decision on the frequency deviation in the transmission frame,
the multilevel symbol detector detects the multilevel symbol according to the difference or the result of the hard decision according to received signal strength of the transmission frame, and when the received signal strength is lower than a threshold, the multilevel symbol detector detects the multilevel symbol based on the difference, while when the received signal strength is greater than the threshold, the multilevel symbol detector detects the multilevel symbol based on the result of the hard decision.

3. A rate determination apparatus comprising:
a memory for storing instructions; and
a processor configured to execute the stored instructions to implement:
  a receiver configured to receive a transmission frame modulated by a Frequency Shift Keying (FSK) modulation scheme;
  a symbol rate detector configured to detect a symbol rate based on a period of a preamble portion in the received transmission frame;
  a multilevel symbol detector configured to detect a multilevel-modulated multilevel symbol based on a frequency deviation in the received transmission frame; and
  a bit rate determiner configured to determine a bit rate based on the detected symbol rate and the detected multilevel symbol, wherein the symbol rate detector detects the symbol rate based on a zero-crossing point in a frequency deviation in the preamble portion or a cross-correlation value with a predetermined periodic pattern of the preamble portion, the symbol rate detector detects the symbol rate based on the zero-crossing point or the cross-correlation value according to received signal strength of the transmission frame, and when the received signal strength is lower than a threshold, the symbol rate detector detects the symbol rate based on the cross-correlation value, while when the received signal strength is greater than the threshold, the symbol rate detector detects the symbol rate based on the zero-crossing point.

* * * * *